(12) United States Patent
Hashiguchi

(10) Patent No.: US 9,082,041 B2
(45) Date of Patent: Jul. 14, 2015

(54) PATTERN IDENTIFYING APPARATUS

(71) Applicant: CANON KABUSHIKI KAISHA, Tokyo (JP)

(72) Inventor: Noriyasu Hashiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 13/916,861

(22) Filed: Jun. 13, 2013

(65) Prior Publication Data

US 2013/0343653 A1    Dec. 26, 2013

(30) Foreign Application Priority Data

Jun. 21, 2012    (JP) .................. 2012-140034

(51) Int. Cl.
*G06K 9/46*    (2006.01)
*G06K 9/66*    (2006.01)
*G06K 9/00*    (2006.01)

(52) U.S. Cl.
CPC ............ *G06K 9/468* (2013.01); *G06K 9/00973* (2013.01)

(58) Field of Classification Search
None
See application file for complete search history.

(56) References Cited

U.S. PATENT DOCUMENTS

| 8,209,497 | B2 * | 6/2012 | Kajigaya ................. | 711/149 |
| 8,798,370 | B2 * | 8/2014 | Hashiguchi .............. | 382/192 |
| 2010/0027354 | A1 * | 2/2010 | Matsui et al. ........... | 365/189.05 |
| 2010/0180189 | A1 | 7/2010 | Ito et al. | |
| 2011/0090340 | A1 | 4/2011 | Hashiguchi | |
| 2012/0051648 | A1 | 3/2012 | Hashiguchi | |
| 2013/0236103 | A1 * | 9/2013 | Hashiguchi .............. | 382/192 |

FOREIGN PATENT DOCUMENTS

| JP | 2008-102792 A | 1/2008 |
| JP | 2008-299627 A | 11/2008 |
| JP | 2012-048402 A | 8/2012 |

OTHER PUBLICATIONS

Yan et al., "Locally Assembled Binary (LAB) Feature with Feature-centric Cascade for Fast and Accurate Face Detection", 26th IEEE Conference on Computer Vision and Pattern Recognition, CVPR, 2008.
Viola et al., "Rapid Object Detection using a Boosted Cascade of Simple Features", Proc IEEE Conf. on Computer Vision and Pattern Recognition, vol. 1, pp. 511-518. Dec. 2001.
F.C. Crow, "Summed-Area Tables for Texture Mapping", Computer Graphics, 1984.

* cited by examiner

*Primary Examiner* — Bhavesh Mehta
*Assistant Examiner* — Feng Niu
(74) *Attorney, Agent, or Firm* — Fitzpatrick, Cella, Harper & Scinto

(57) ABSTRACT

The present invention enables a pattern identifying apparatus that calculates a feature amount and identifies a predetermined pattern, such as a face, based on the calculated feature amount to perform processing for reading a large volume of data at a high speed. To achieve this, a coprime relationship is established between an interval between adjoining processing windows arranged in an image and the number of memories in which the image is interleaved and stored, thereby always establishing an exclusive relationship between the memories from which data at the same position relative to reference points in the respective processing windows is read. It is thus possible to read data simultaneously, resulting in achievement of speedup.

12 Claims, 29 Drawing Sheets

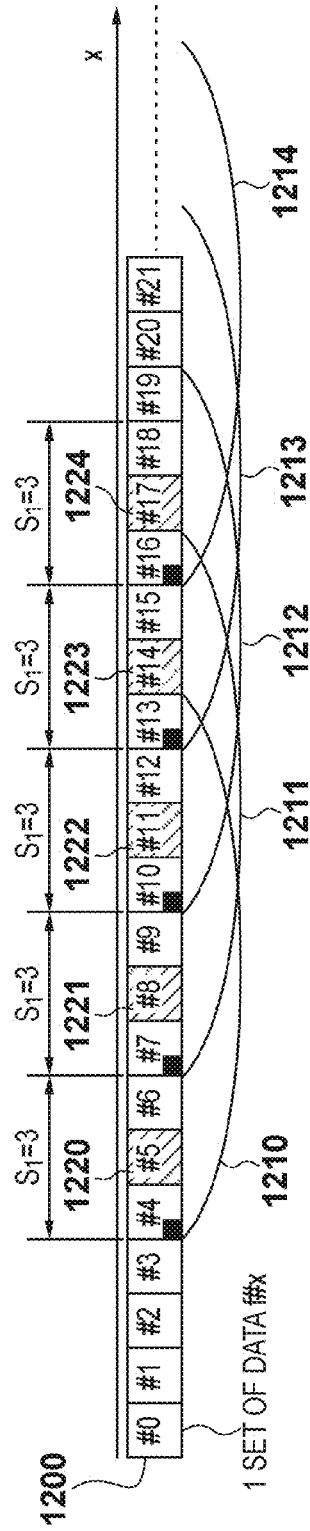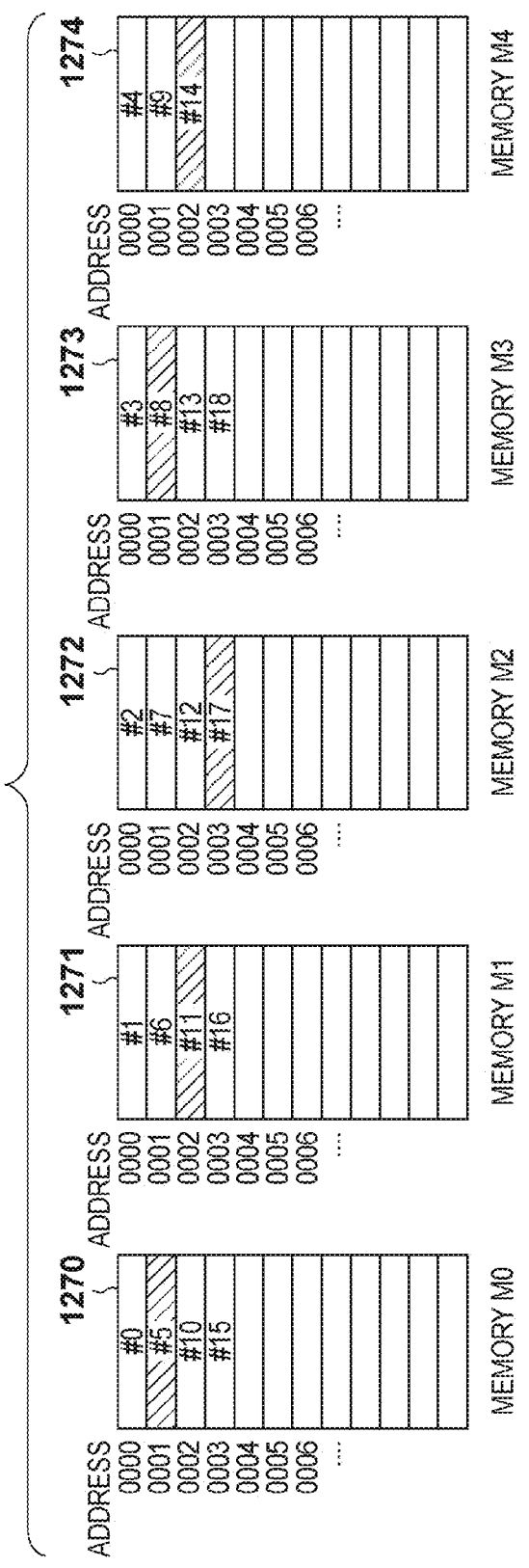

FIG. 17

STRIDE=1 — 1701

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |

STRIDE=2 — 1702

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |

STRIDE=3 — 1703

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |

STRIDE=4 — 1704

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |

STRIDE=5 — 1705 (NOT USE)

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |
| | 20 | 21 | 22 | 23 | 24 |

STRIDE=6 — 1706

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |
| | 20 | 21 | 22 | 23 | 24 |

STRIDE=7 — 1707

| MEMORY | M00 | M01 | M02 | M03 | M04 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |
| | 20 | 21 | 22 | 23 | 24 |
| | 25 | 26 | 27 | 28 | 29 |

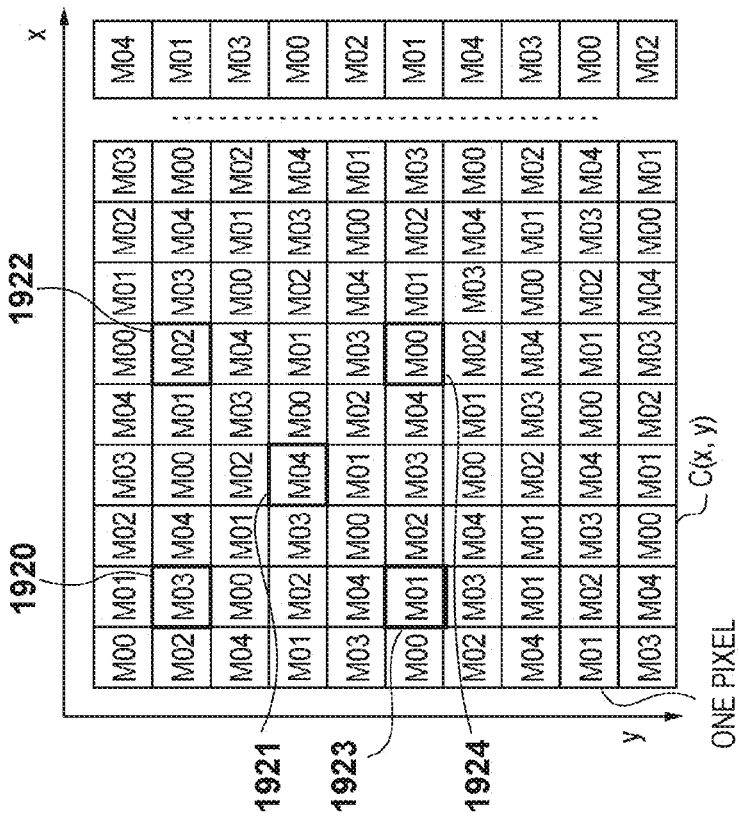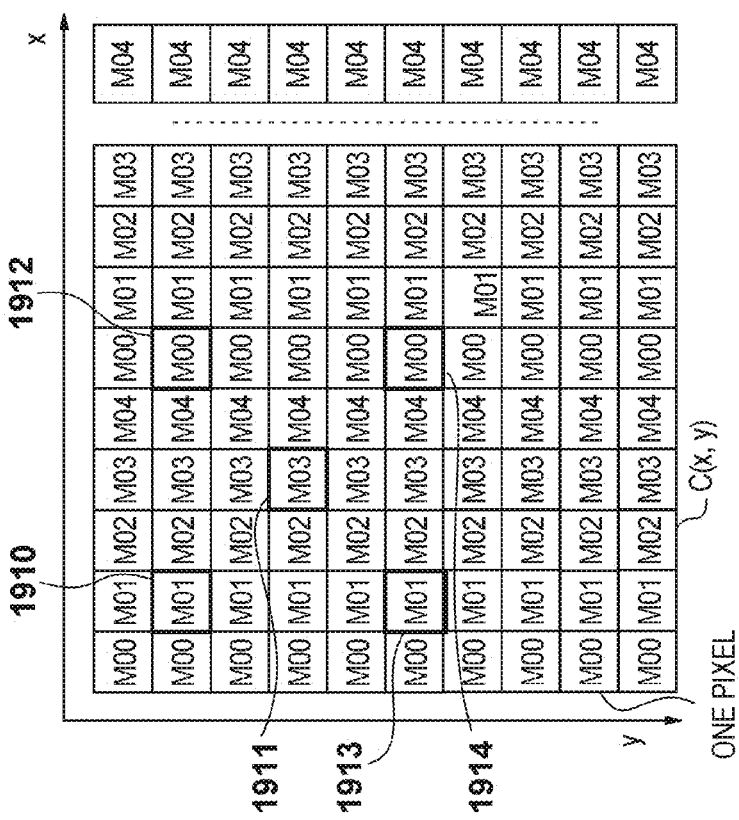

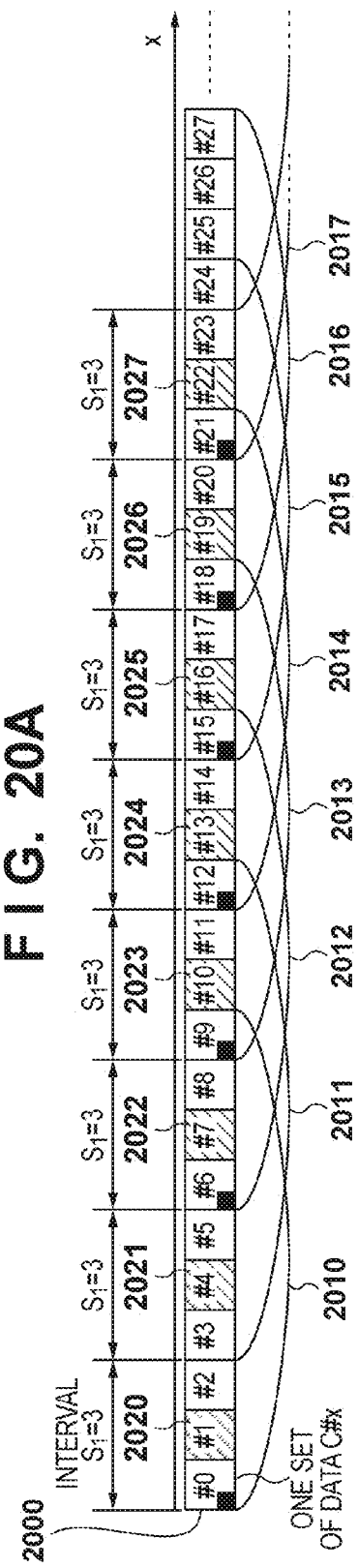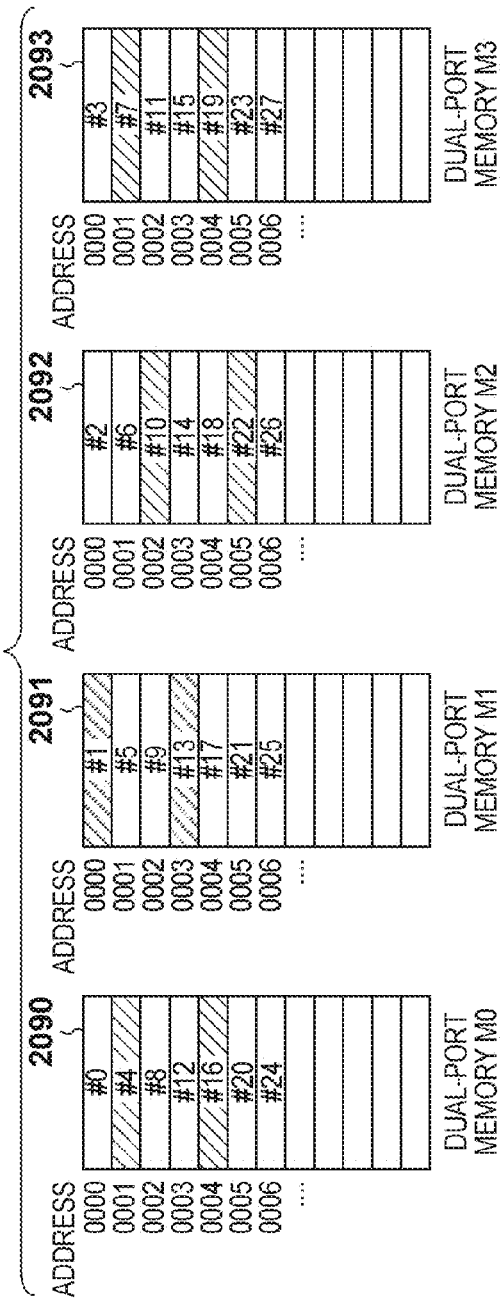

INITIAL STATE OF WINDOW GROUP

STATE IN WHICH NUMBER OF PROCESSING WINDOWS FOR WHICH IT HAS BEEN
CONFIRMED THAT NO DETECTION TARGET APPEARS
(I.E., PROCESSING WINDOWS FOR WHICH FALSE DETERMINATION WAS OBTAINED)
HAS BEEN ELIMINATED (PROCESSING FOR PROCESSING
WINDOWS 2101 AND 2105 HAS BEEN ABORTED)

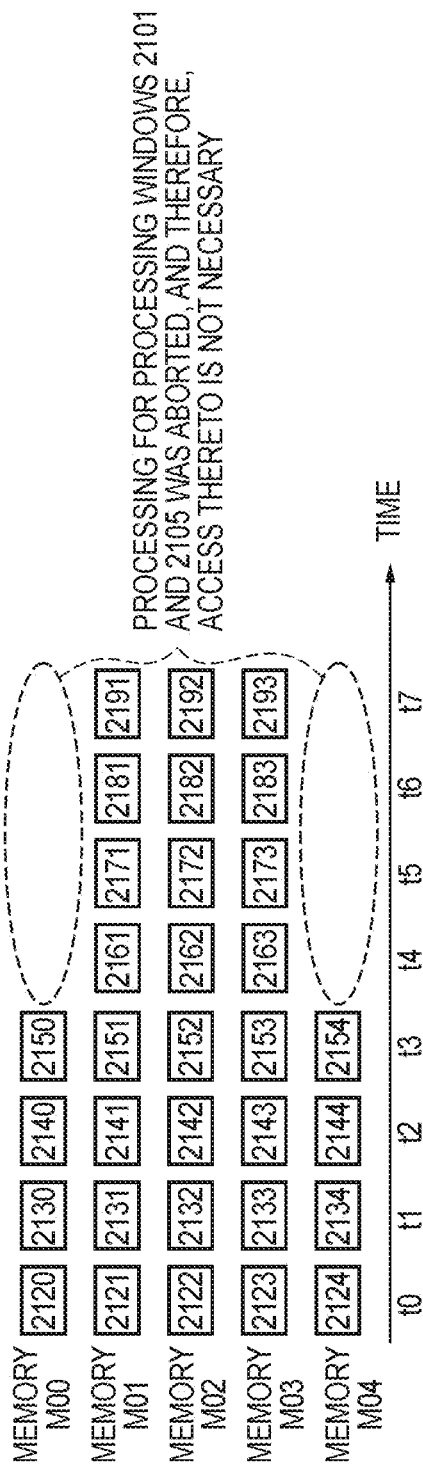

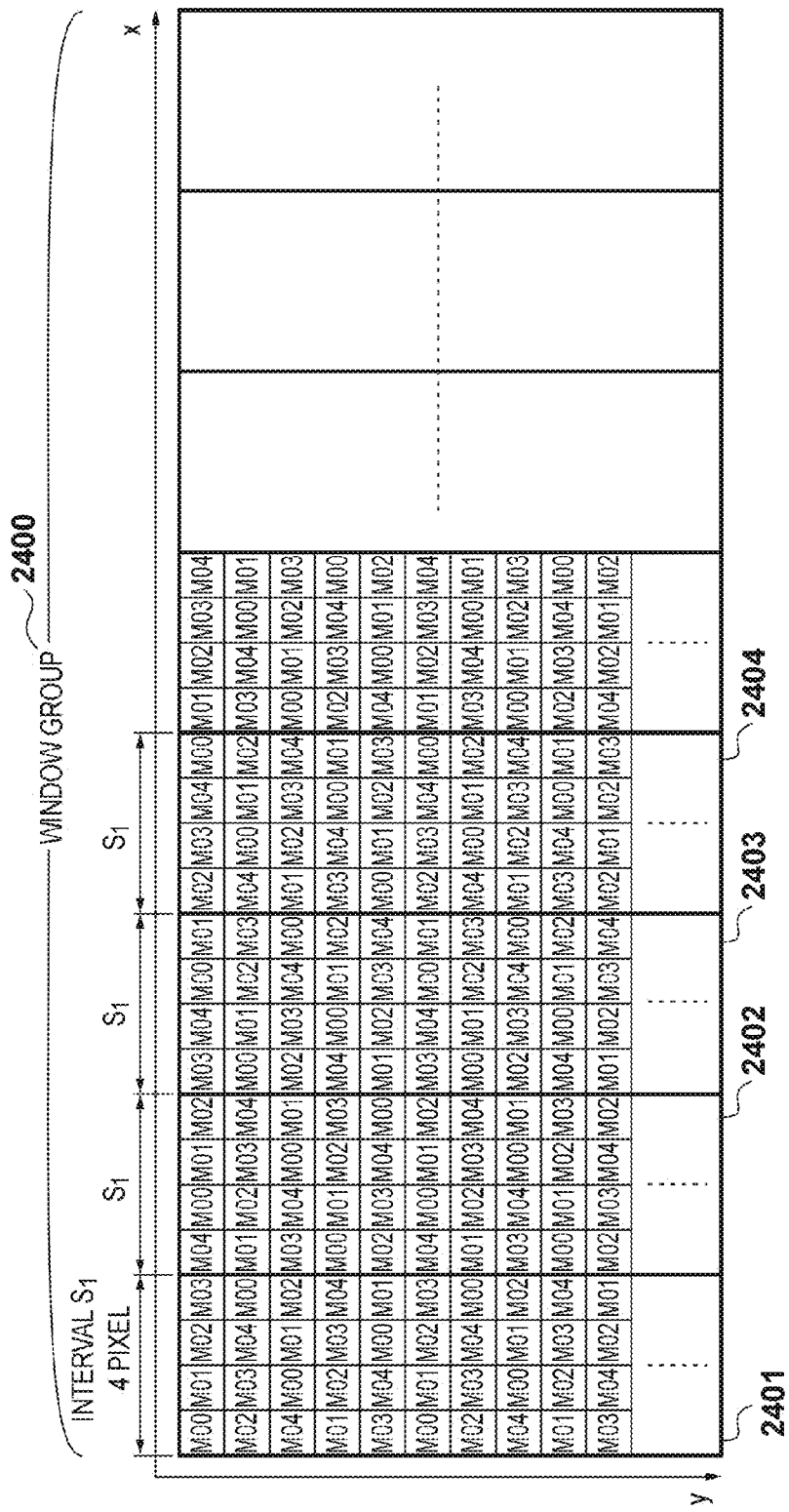

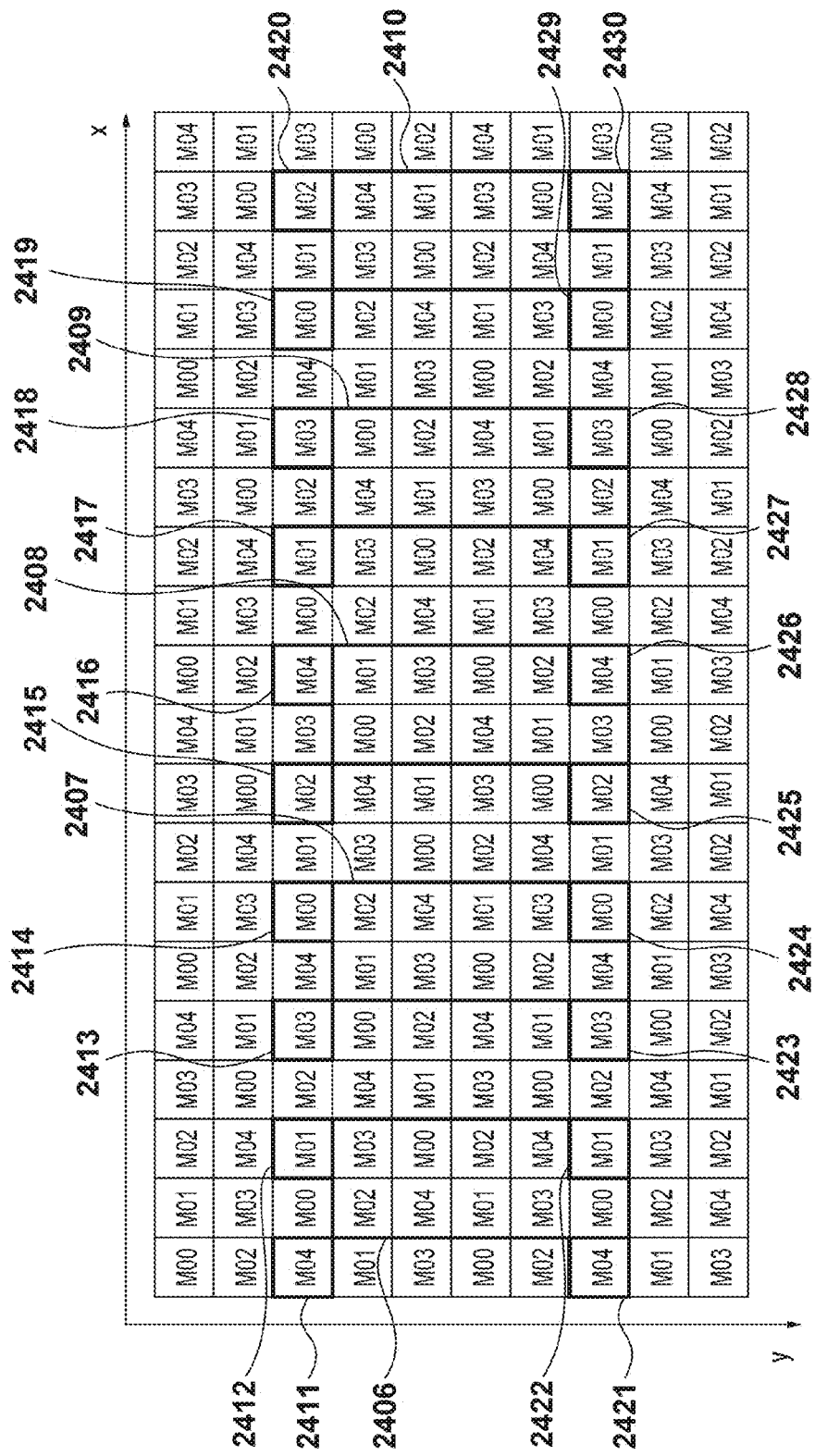

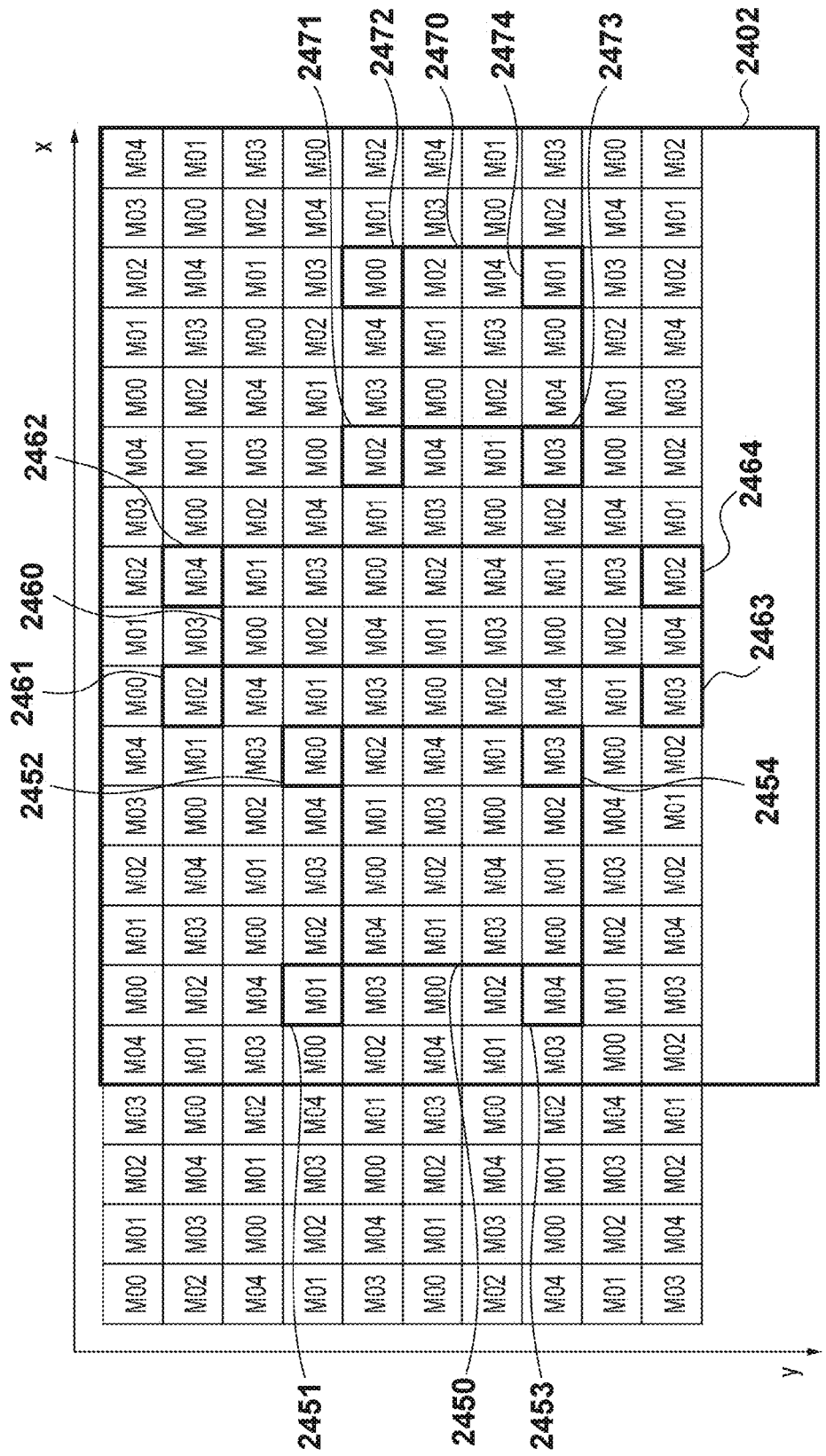

F I G. 25
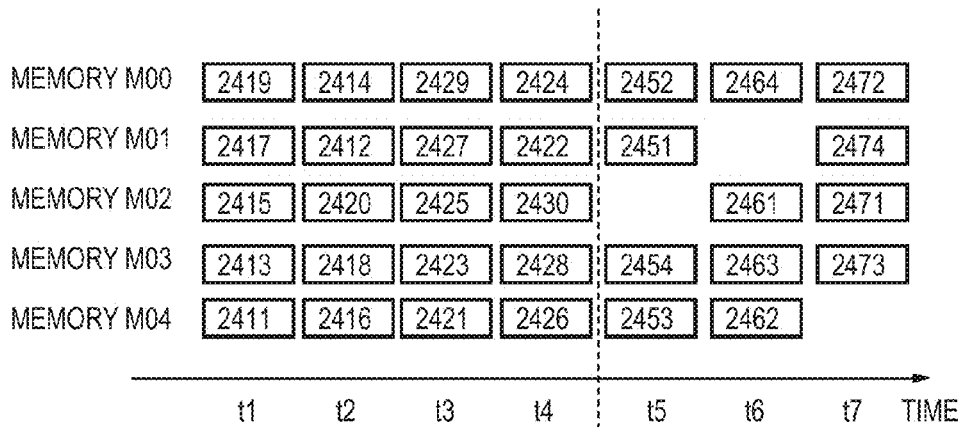

PATTERN IDENTIFYING APPARATUS

BACKGROUND OF THE INVENTION

1. Field of the Invention

The present invention relates to pattern identifying apparatuses used in image recognition, information analysis, and the like.

2. Description of the Related Art

In the field of information processing, information in a multi-dimensional array is frequently handled. Among them, in statistical processing, some processing related to image processing, image recognition, and image synthesis, and the like, a sum value of elements within a specific regional range is often obtained and used.

In the field of computer graphics, F. C. Crow proposes a concept of accumulation information in a rectangular shape with respect to original input image information, which is called a summed-area table (F. C. Crow, "Summed-Area Tables For Texture Mapping", Computer Graphics, 1984; hereinafter, "Document 1"). In this Document 1, the summed-area table is formed in a two-dimensional array, which is the same as an input image, and assuming that a pixel value at coordinates (x, y) of the input image is I(x, y), a component C(x, y) at the same position (x, y) in the summed-area table is defined as expression (1) below.

$$C(x, y) = \sum_{\substack{x' \leq x \\ y' \leq y}} I(x', y') \quad (1)$$

In other words, the sum value of pixels within a rectangle having the pixels at an origin position (0, 0) and at the position (x, y), which form a diagonal of the rectangle, in an original input image shown in FIG. 7A is the value C(x, y) at the position (x, y) in the summed-area table shown in FIG. 7B. Note that although it is assumed in the explanation of the original summed-area table in Document 1 that the origin position is the lower left corner of an image, it is assumed in the present specification that the upper left corner is the origin, for the purpose of consistency with the later description.

According to the above definition, the sum of I(x, y) within an arbitrary rectangular region that is put horizontally or vertically on the input image can be obtained only by referring to four points on the summed-area table, using expressions below. For example, as shown in FIG. 8, the sum $C(x_0, y_0; x_1, y_1)$ of pixel values within a rectangular region having $(x_0, y_C)$ and $(x_1, y_1)$ $(X_0 < X_1, y_0 < y_1)$, which form a diagonal, can be obtained by calculating expression (2) below.

$$C(x0,y0;x1,y1) = C(x0-1,y0-1) - C(x0-1,y1) - C(x1,y0-1) + C(x1,y1) \quad (2)$$

It is thereby possible to obtain the sum of values within an arbitrary rectangular region on an image, at a high speed. Note that the first argument of C in expression (2) is −1 in some cases, where C(−1, *) returns 0. Also, the second argument of C is −1 similarly in some cases, where C(*, −1) returns 0. "*" means "don't care", and may be any values. Japanese Patent Laid-Open No. 2008-299627 (hereinafter, "Document 2") describes one method for implementing accumulation information.

In P. Viola, M. Jones, "Rapid Object Detection using a Boosted Cascade of Simple Features", Proc. IEEE Conf. on Computer Vision and Pattern Recognition, Vol. 1, pp. 511-518, December 2001 (hereinafter, "Document 3"), accumulation information that is equivalent to the aforementioned summed-area table is called an "integral image". In Document 3, a feature amount is calculated in a plurality of local regions using the integral image to perform pattern identification. A "local region" indicates a partial region of an image region that is cut out of an input image. To calculate a feature amount used in pattern identification, a parameter that is obtained in advance by means of learning is used. The parameter includes information of the position, size, and the like of a local region whose feature amount is to be calculated. Usually, the position of each local region that is referred to in pattern identification is random, and accumulation information needs to be read at random.

For example, in the case where accumulation information is stored in a single-port memory from which one set of data can be read at a time, reading of four vertices (points A, B, C, and D in FIG. 8; hereinafter, the four vertices are the points A, B, C, and D in FIG. 8) for obtaining the sum of values within a local region is serialized, and is processed by performing memory access four times. Assuming that one cycle is taken for one memory access, four cycles are necessary for reading the four vertices.

With this method, if high detection performance (which depends on the frame rate, the image size, the number of detection targets, etc.) is required, memory access can possibly be a bottleneck. To achieve speedup, it is required that part or all of the four times of serialized reading are able to be processed simultaneously.

Methods for reducing the read time includes a method of using a dual-port memory from which two sets of data can be simultaneously read at a time. Two of four vertices can be read at a time when the dual-port memory is used, and it is thereby possible to reduce the read time from four cycles to two cycles. However, the dual-port memory has a problem in that the circuit scale is larger than that of the single-port memory.

As another method, it is also conceivable to write the same accumulation information in four single-port memories and read the four vertices from the respective memories in parallel. However, this method requires four times the memory size used in the method of using one memory.

Still another method is that disclosed in Japanese Patent Laid-Open No. 2008-102792 (hereinafter, "Document 4"). Document 4 describes a method of dividing an image into a plurality of images and creating accumulation information regarding the respective divided images, thereby enabling reduction of the number of times of reading in a case of obtaining a sum in rectangles that are in contact with boundaries between divided images.

Still another method is that disclosed in Japanese Patent Laid-Open No. 2012-48402 (hereinafter, "Document 5"). Document 5 describes a method of writing an integral image in a plurality of storage devices in accordance with a predetermined rule, thereby enabling parallel reading at the time of reading the integral image. Also, in Document 5, four vertices of the integral image can be read in parallel at the time of execution by imposing a restriction on the shape of each local region at the time of learning. Thus, the bottleneck of memory access is resolved, and an apparatus capable of high-speed reading is realized.

Furthermore, according to S. Yan, S. Shan, X. Chen, and W. Gao. "Locally assembled binary (lab) feature with feature-centric cascade for fast and accurate face detection", 26th IEEE Conference on Computer Vision and Pattern Recognition, CVPR, 2008 (hereinafter, "Document 6"), it is proposed that a region to be referred to for calculation of a feature amount is read in the form shown in FIG. 15 in order to improve recognition accuracy. Reference regions shown in FIG. 15 are blocks (1550 to 1558) having the same width and height that are arranged in a tile-like form, and the sum of pixels within each block is calculated by reading 16 points, namely vertices 1501 to 1516 of the blocks. As described above, creativity has been exercised in various manners to read an integral image at a high speed.

However, feature amounts other than the integral image are also used in recognition processing. For example, there is a difference feature that is calculated by reading a difference between arbitrary pixels within an image. In a case of designing an apparatus for recognition processing that can handle various feature amounts including not only an integral image but also a difference feature and the like, and is capable of high-speed processing, a capability to achieve speedup of various memory reading patterns corresponding to the respective feature amounts is required.

However, the above-described methods are for speedup of calculation of specific feature amounts, and cannot be applied to various other feature amounts. Moreover, if a restriction is imposed on the shape of each local region for the purpose of speedup, it affects recognition accuracy in some cases, and it is therefore important to eliminate the restriction.

SUMMARY OF THE INVENTION

The present invention was made in light of the foregoing points. The present specification provides a technique that enables processing for reading a large volume of data at a high speed with a pattern identifying apparatus that calculates a feature amount and identifies a predetermined pattern, such as a face, based on the calculated feature amount.

To solve the above-stated problem, for example, a pattern identifying apparatus disclosed in the present specification has the following configuration. That is, there is provided a pattern identifying apparatus in which a plurality of processing target regions are arranged at an interval that is determined for each dimensional direction of input data in predetermined dimensions, and that identifies a predetermined pattern from each processing target region, the apparatus comprising: an input unit for inputting data in the predetermined dimensions; a plurality of storage units whose number is a product of the number that is assigned to each dimension to hold input data obtained by the input unit; a writing unit that writes the input data in the plurality of storage units in accordance with a predetermined rule; a reading unit that reads, in parallel, data at the same position in each of the processing target regions relative to a reference point, which is provided in each of the processing target region; a calculating unit that calculates a feature amount using a plurality of sets of data that are read in parallel by the reading unit; and an identifying unit that identifies a predetermined pattern using the feature amount calculated by the calculating unit, wherein at least one pair of the interval determined for each dimensional direction and a corresponding number of the storage units is in a coprime relationship.

According to the present invention, processing for reading a large volume of data at a high speed is possible with a pattern identifying apparatus that calculates a feature amount and identifies a predetermined pattern, such as a face, based on the calculated feature amount. Furthermore, there is no restriction on the shape, position, or the like, resulting in no influence on recognition accuracy.

Further features of the present invention will become apparent from the following description of exemplary embodiments (with reference to the attached drawings).

BRIEF DESCRIPTION OF THE DRAWINGS

FIGS. 12A and 12B are diagrams illustrating assignment of a one-dimensional array to memories according to a third embodiment.

FIG. 17 is a diagram illustrating a relationship between the number of assigned memories and strides according to the first embodiment.

FIGS. 19A to 19F are diagrams illustrating parallel reading in special arrangements according to the second embodiment.

FIGS. 20A and 20B are diagrams illustrating assignment of a one-dimensional array to dual-port memories according to other embodiments.

FIGS. 21A to 21C are diagrams illustrating states of processing windows within a window group according to a fifth embodiment.

FIGS. 24A to 24C are diagrams illustrating processing modes according to the fifth embodiment.

FIG. 25 is a timing chart showing timings before and after switching of a processing mode according to the fifth embodiment.

DESCRIPTION OF THE EMBODIMENTS

Hereinafter, embodiments of the present invention will be described in detail in accordance with attached drawings.

Note that in the following embodiments, information in the form of a two-dimensional array such as the summed-area table or the integral image, which were described as the conventional techniques, will be referred to as accumulated image information (or an integral image). It will be referred to as accumulation information in the case where the number of dimensions is not particularly limited. Also, image information in the form of a two-dimensional array (including not only image information regarding an RGB image, a Grayscale image, or the like, but also information regarding a processed image such as an image after being subjected to a primary differentiation filter) will be referred to as input image information.

First Embodiment

In the present embodiment, first, the configuration of a pattern identifying apparatus will be described. Thereafter, a method for distributing accumulated image information to memories and parallel reading will be described.

Figure 1:
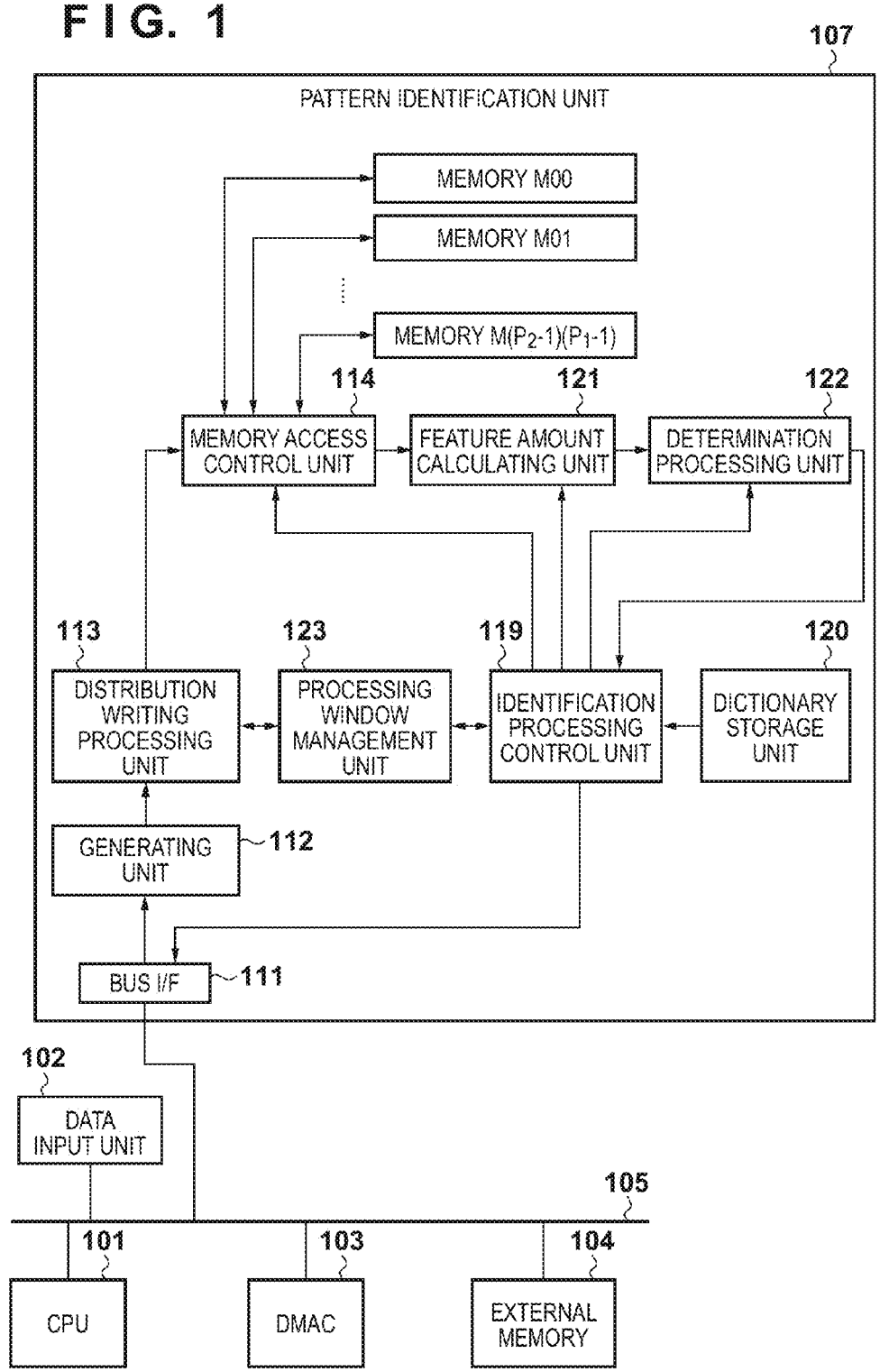
FIG. 1 is a block diagram showing a configuration of a pattern identifying apparatus according to a first embodiment.

FIG. 1 is a block diagram showing the configuration of a pattern identifying apparatus according to a first embodiment. In FIG. 1, reference numeral 101 denotes a CPU, which controls components that are connected via a bus 105. Reference numeral 102 denotes a data input unit for inputting input image information, which takes input image information to be a processing target into the apparatus. The data input unit 102 may be constituted by, for example, an image sensor such as a CCD, or may be an I/F device that has a predetermined communication path, such as a network and receives data to be processed from an external device, and thus, any kind of data input unit can be used. Reference numeral 104 denotes an external memory that is connected to the bus 105 and is constituted by a storage device such as a ROM, a RAM, or a HDD. The external memory 104 stores program codes according to which the CPU 101 operates, and is used as a work area for performing various kinds of processing. It is also used as an area for holding various kinds of information used in input image information and pattern identification as necessary. Reference numeral 103 denotes a DMA controller (hereinafter, DMAC), which can independently and sequentially transfer data of a predetermined size to the data input unit 102, the external memory 104, and a pattern identification unit 107, as a result of the CPU 101 configuring settings and giving an operation instruction. The DMAC 103, upon completing an instructed transfer operation, notifies the CPU 101 of an interrupt signal via the bus 105. Reference numeral 107 denotes a pattern identification unit, which performs pattern identification processing on input image information that is transmitted from the DMAC 103 via the bus 105. In the pattern identification processing, it is determined whether or not a predetermined detection pattern (e.g., a face, a standing image of a human body, etc.) is detected in input image information, and detected information such as a detected position, a detected shape, and a probability is output. The detected information is written in the external memory 104 via the bus 105.

The pattern identification unit 107 is constituted by a bus interface 111, a generating unit 112, a distribution writing processing unit 113, a memory access control unit 114, $P_1 \times P_2$ memories M00 to M($P_2-1$)($P_1-1$), an identification processing control unit 119, a dictionary storage unit 120, a feature amount calculating unit 121, a determination processing unit 122, and a processing window management unit 123.

Figure 16:
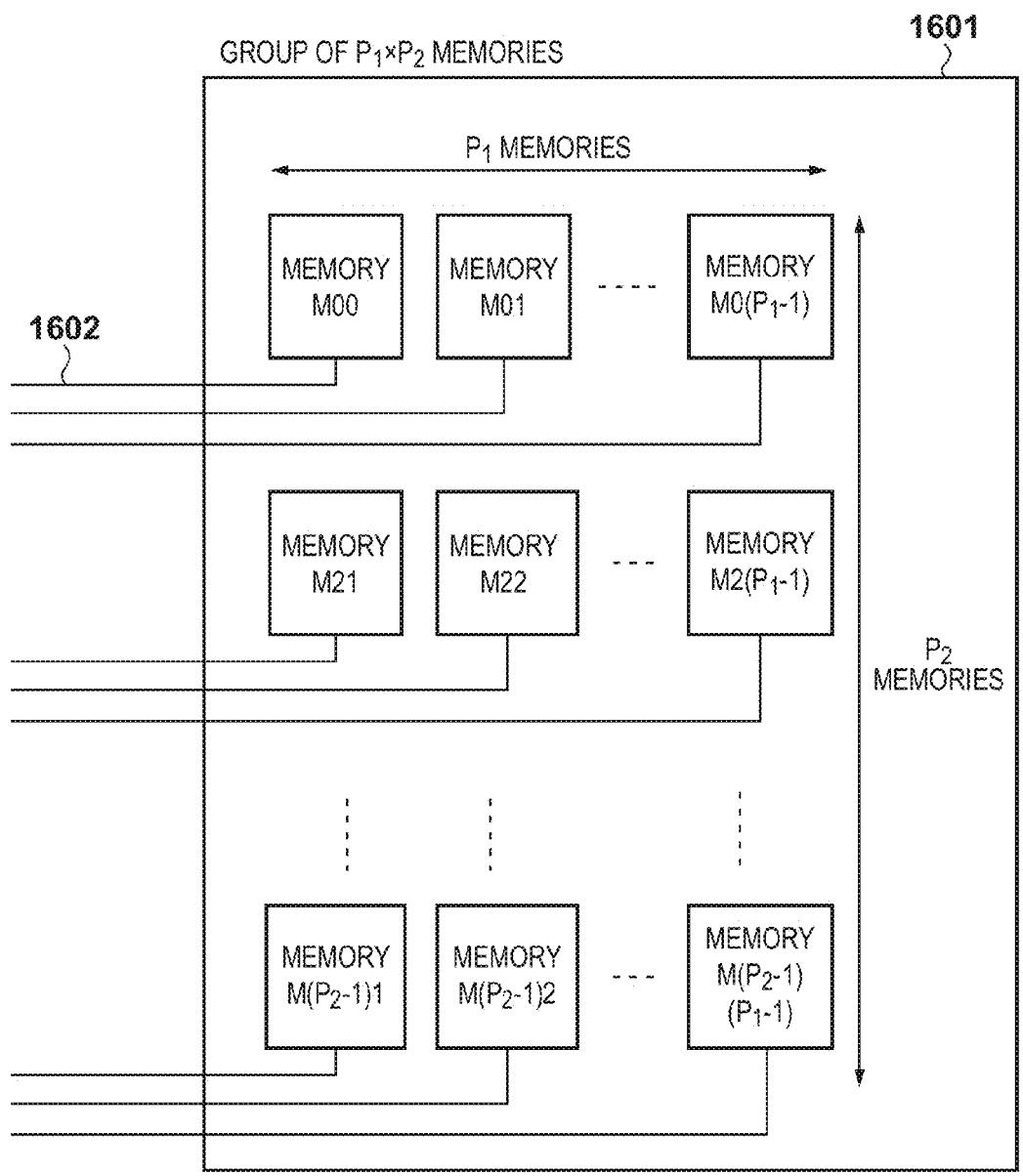
FIG. 16 is a diagram illustrating a configuration of a memory group including $P_1 \times P_2$ memories according to the first and second embodiments.

The $P_1 \times P_2$ memories M00 to M($P_2-1$)($P_1-1$) according to the present embodiment are single-port memories, and are used as $P_1 \times P_2$ memories that are assigned into a two-dimensional configuration as shown as a memory group 1601 of FIG. 16. $P_1$ represents the number of memories assigned in the horizontal direction, and $P_2$ represents the number of memories assigned in a vertical direction. Reference numeral 1602 denotes a general single-port memory interface signal of an address, data, or the like. Control of input to and output from the memories is performed by the memory access control unit 114 by way of the memory interface signals.

Figure 2:
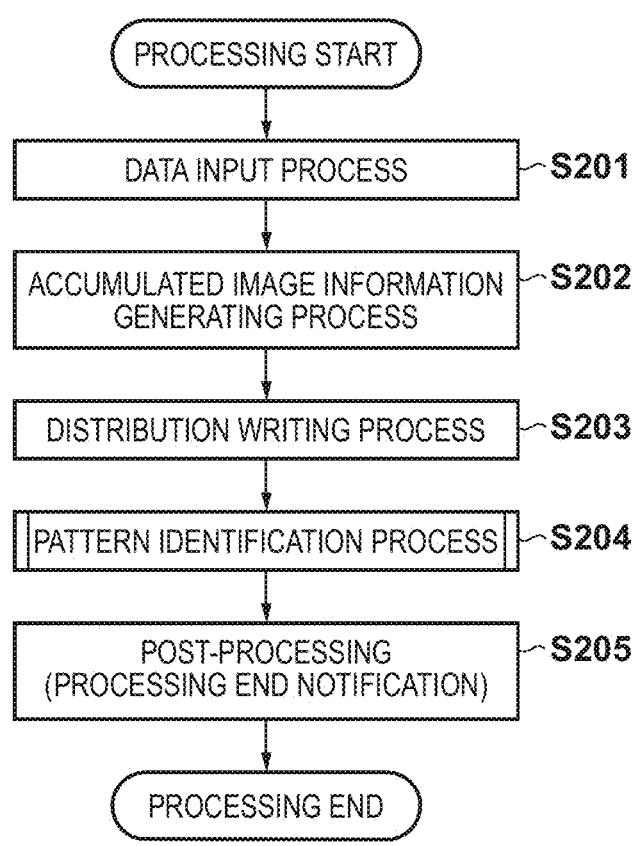
FIG. 2 is a flowchart of overall processing according to the first embodiment.

Next, the details of the pattern identifying apparatus of FIG. 1 and the overall flow of processing will be described using the flowchart of FIG. 2.

The pattern identifying apparatus of the first embodiment first executes data input processing (S201) in response to a processing start trigger that is given by a user operation or from an external device (not shown). In step S201, first, the pattern identifying apparatus receives input image information from the data input unit 102 in accordance with an instruction by the CPU 101, and accumulates the received input image information in the external memory 104 via the bus 105. The DMAC 103 transfers the input image information accumulated in the external memory 104 to the pattern identification unit 107 under the control of the CPU 101.

The pattern identification unit 107 receives the input image information transferred via the bus 105 at the bus interface 111, and transfers the input image information to the generating unit 112. Note that it is assumed in the present embodiment that the input image information is input in raster order in units of pixels from the pixel at the upper left of the image. Also, although a source that generates an image to be a processing target is an image sensor such as a CCD in the following description of the present embodiment, it may also be a storage device that stores the image, or may be any kinds of input source.

In the next step S202, accumulated image information generating processing is performed. The generating unit 112 performs accumulation processing on the input image information that is transmitted in raster order, and generates the accumulated image information. The generating unit 112 of the first embodiment has a first storage region (variable region) constituted by pixels whose capacity is at least one line of pixels in the horizontal direction of a processing target, and a second region that holds a result of accumulation of pixel values from the left end to the position of a pixel of interest that are on one line, and calculates the accumulated image information as follows.

Now, it is assumed that the number of pixels in the horizontal direction is represented as W. Accordingly, the generating unit 112 allocates variables C(0), C(1), . . . C(W−1) as the first storage region. These variables C( ) are cleared to zero prior to image recognition. Meanwhile, the second storage region is cleared to zero in units of one line. If a pixel position in the horizontal direction on a certain line is represented as i (0≤i≤w−1) and the pixel value at this position is represented as $X_i$, the generating unit 112 calculates accumulated image information (C(i)) by the following computation and outputs it every time a pixel is input.

$$C(i) \leftarrow C(i) + \Sigma X_k$$

(where "Σ" indicates summation with respect to k, and k=0, 1, 2, . . . , and i)

The above expression can be briefly explained as follows.

When the $i^{th}$ pixel value in the horizontal direction on the first line (zero-th line) is input, C(i) in the right-hand side of the above expression is 0 (it has been cleared to zero in its initial state). Accordingly, C(i) in the left-hand side of the above expression when the $i^{th}$ pixel $X_i$ on the first line is input includes $\Sigma X_k$, that is, accumulated image information represented as "$X_0+X_1 \ldots +X_i$".

Then, when the $i^{th}$ pixel $X_i$ in the horizontal direction on the $j^{th}$ line (j>0) is input, C(i) in the right-hand side of the above expression holds the accumulated image information within a rectangle whose diagonal is a line connecting the origin (0, 0) at the upper left corner of the image and coordinates (i, j−1) on an immediately previous line. Since $\Sigma X_k$ in the right-hand side of the above expression is the summation of values of the pixels from the pixel at the left end up to the $i^{th}$ pixel, which is of interest, on the $j^{th}$ line, which is of interest, C(i) in the left-hand side of the above expression holds the accumulated image information within a rectangle having the origin (0, 0) and coordinates (i, j) as vertices on its diagonal.

The generating unit 112 accumulates the pixel values with the origin being the pixel on the upper left corner of the image of the input image information as described above, and sequentially transfers an accumulation result as the accumulated image information to the distribution writing processing unit 113.

In the next step S203, processing for distribution writing of the accumulated image information is performed. The distribution writing processing unit 113 first inquires of the processing window management unit 123 as to whether or not writing in the memories may be performed. The processing window management unit 123 manages exclusion control of writing in the memories by the distribution writing processing unit 113 and reading by the identification processing control unit 119.

Figure 9:
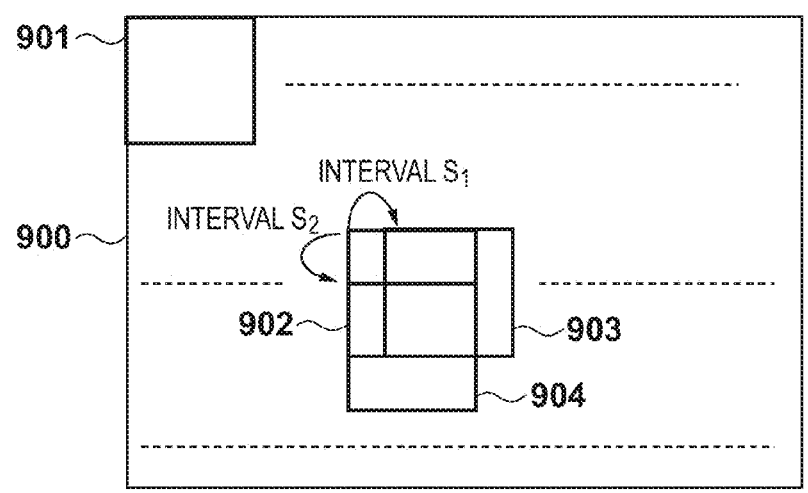
FIG. 9 is a diagram illustrating processing windows and an arrangement thereof.

Here, a processing window is the unit of processing target regions on the image on which the pattern identifying apparatus performs processing. FIG. 9 is a diagram illustrating processing windows and an arrangement thereof. Reference numeral 900 denotes input image information, and reference numeral 901 denotes a processing window. A processing window is one unit on which the pattern identification processing is performed. The pattern identification processing is performed on the processing window 901, and it is determined whether or not a predetermined detection pattern is present in the processing window 901. The processing windows are arranged on the input image information 900 at an interval of $S_1$ pixels in the horizontal direction and $S_2$ pixels in the vertical direction. For example, a processing window that is next to the processing window 902 on the right side is at the position of a processing window 903, which is located at an interval of $S_1$ pixels in the horizontal direction. Also, a lower processing window is at the position of a processing window 904, which is located at an interval of $S_2$ pixels in the vertical direction.

The processing window management unit 123 manages the positions of the processing windows and the memories. The distribution writing processing unit 113 receives permission for a predetermined number of sets of writing in order to prepare a processing window to be a processing target, from the processing window management unit 123. Then, the distribution writing processing unit 113 determines memory numbers (memories M00 to M($P_2$−1) ($P_1$−1)) and addresses of a write destination in units of pixels of the accumulated image information, and gives a write instruction to the memory access control unit 114. The details of the method for determining the memory numbers and the addresses will be described later as a method for distributing the accumulated image information to the memories.

The memory access control unit 114 stores the accumulated image information in the memories M00 to M($P_2$−1) ($P_1$−1) in accordance with the instructed memory numbers and addresses. When the predetermined number of sets of writing ends, the distribution writing processing unit 113 notifies the processing window management unit 123 of the end of writing.

Figure 3:
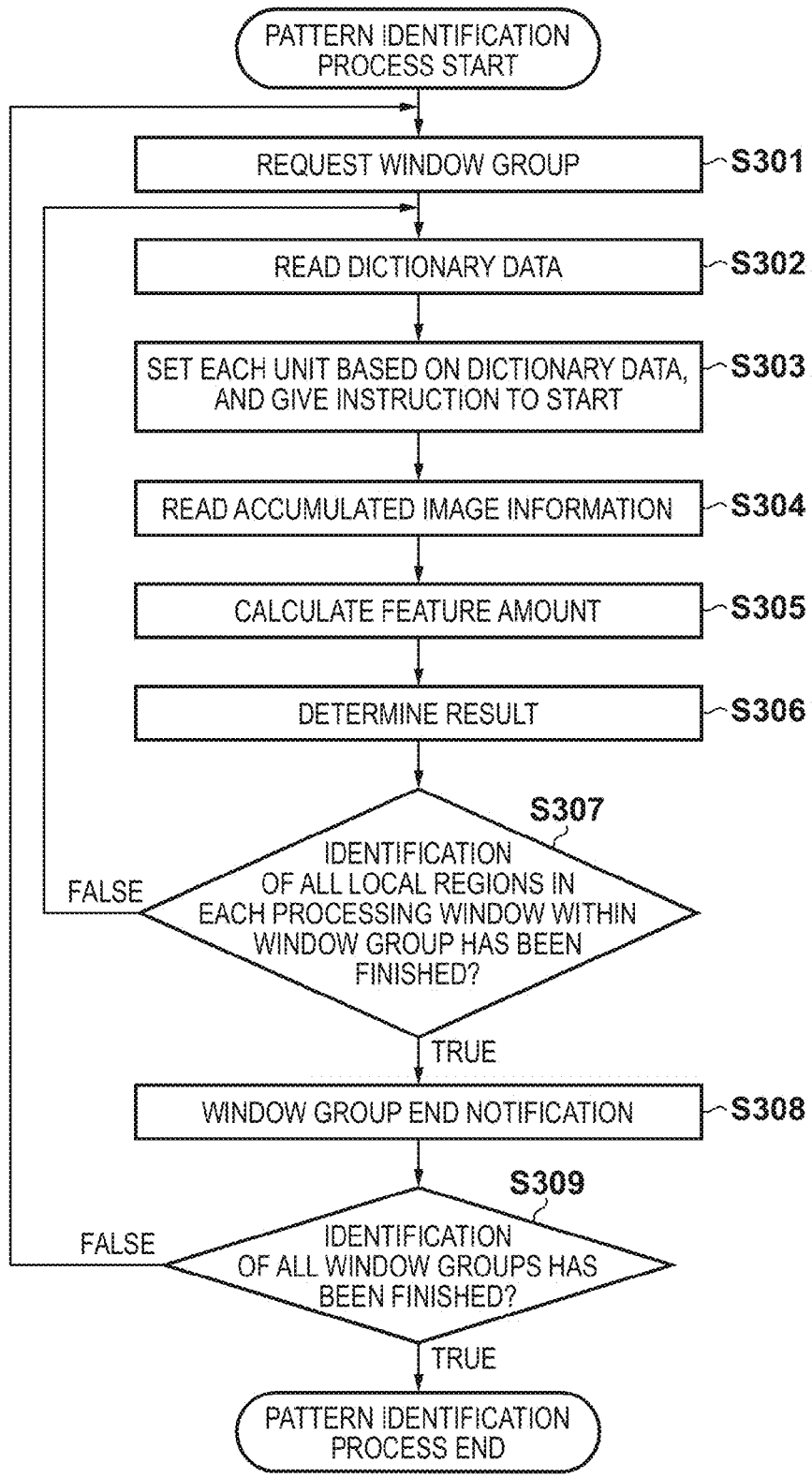
FIG. 3 is a flowchart of pattern identification processing according to the first embodiment.

In the next step S204, pattern identification processing is performed. The details of the pattern identification processing in step S204 are shown in the flowchart of FIG. 3.

Figure 10:
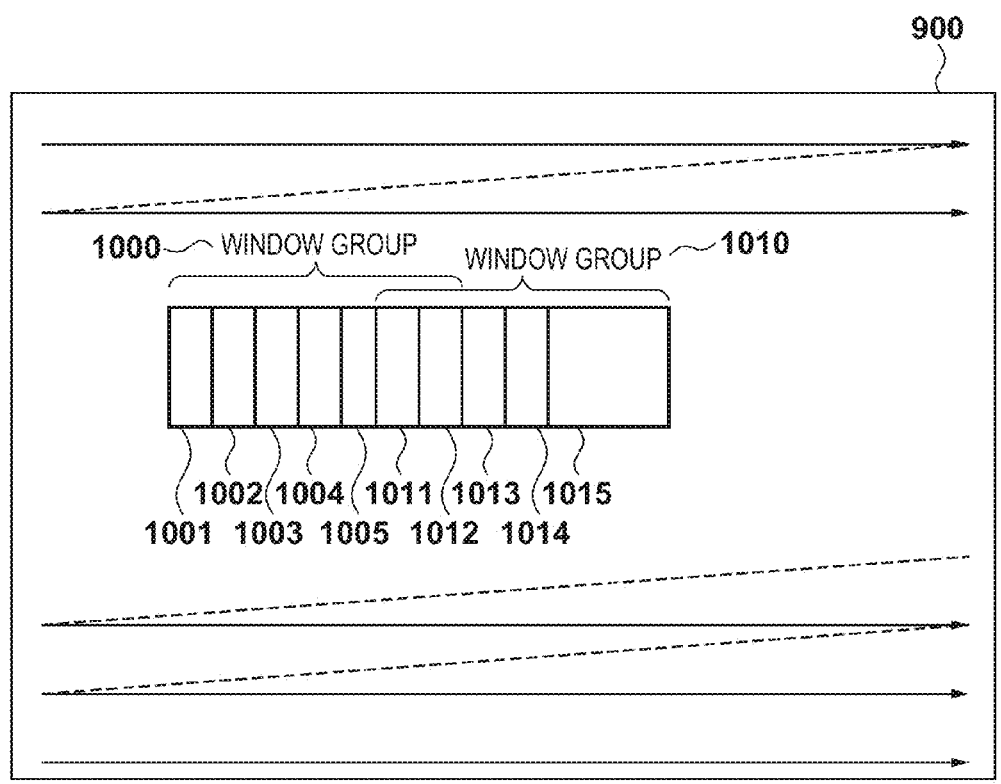
FIG. 10 is a diagram illustrating window groups.

First, in step S301, the identification processing control unit 119 requests a window group to be a processing target from the processing window management unit 123. A bundle of a plurality of processing windows 1001 to 1005 that are arranged at an interval of $S_1$ pixels in the horizontal direction in the input image information 900, as shown in FIG. 10, is referred to as a window group 1000. A window group 1010 that is next thereto is constituted by a plurality of processing windows 1011 to 1015. In the present embodiment, pattern identification processing is performed on the plurality of processing windows within each window group in parallel. The order of processing on each window group is from the window group located on the upper left side of the input image information 900, as denoted by the arrows in FIG. 10.

After data for the window group to be a processing target is prepared in the memories M00 to M($P_2$−1) ($P_1$−1), processing proceeds to the next step S302. In step S302, dictionary data reading processing is performed. The identification processing control unit 119 controls the identification process, based on dictionary data stored in the dictionary storage unit 120. The dictionary data is a parameter group that is obtained in advance by learning. The dictionary storage unit 120 is a memory for storing data, and may be a ROM or a RAM. In the case of a RAM, the dictionary data is written by a device that is not shown in the drawings. The dictionary data stores parameters such as the position and shape of a local region whose feature amount is to be calculated from the accumulated image information, and a coefficient and a threshold value for the determination process.

In the next step S303, in order to calculate the feature amount and perform the determination process, settings of the memory access control unit 114, the feature amount calculating unit 121, and the determination processing unit 122 are performed based on the parameters in the dictionary data, and an instruction to start processing is given. The identification processing control unit 119 calculates the memory numbers of memories to be read and the addresses thereof from the parameters in the dictionary data, sets the calculated memory numbers and addresses in the memory access control unit 114, and gives an instruction to start processing for reading the accumulated image information. Also, the identification processing control unit 119 extracts the parameters (a coefficient, a threshold value, etc.) used by the feature amount calculating unit 121 and the determination processing unit 122 from the dictionary data, sets the parameters in the feature amount calculating unit 121 and the determination processing unit 122, and gives an instruction to start processing.

Figure 11:
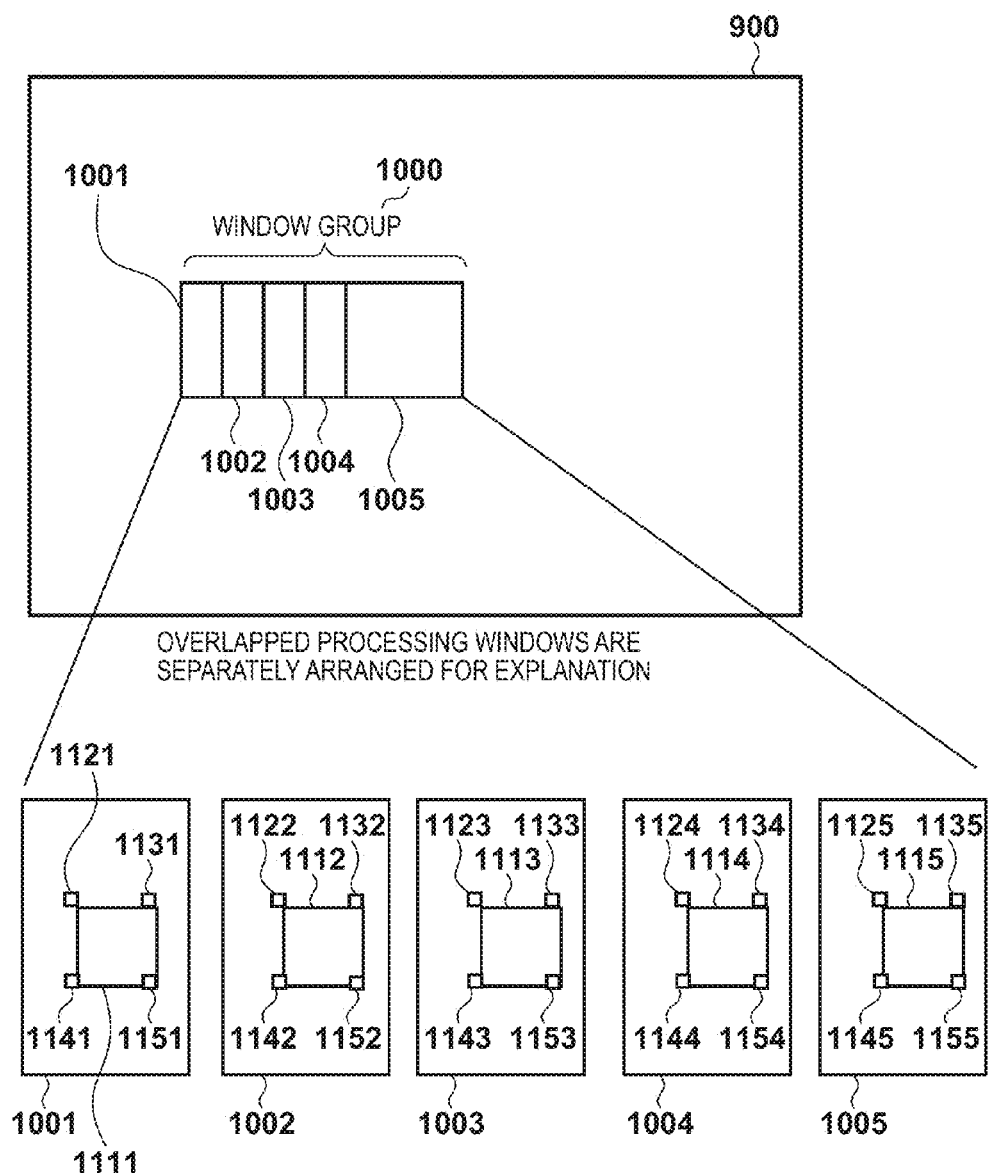
FIG. 11 is a diagram illustrating a positional relationship between local regions and read pixels.

In the next step S304, processing for reading the accumulated image information is performed. In the reading processing, data is read in parallel from the processing windows 1001 to 1005 within the window group 1000, as shown in FIG. 11.

First, read pixels 1121 to 1125 within local regions 1111 to 1115, which are located at relatively the same position in the respective processing windows, are read in parallel. Next, read pixels 1131 to 1135 are read in parallel. Similarly, read pixels 1141 to 1145 and read pixels 1151 to 1155 are read in parallel, respectively. The principles that allow these pixels to be read in parallel will be described later. Then, the memory access control unit 114 transmits the above pixel data that is read in parallel from the memories to the feature amount calculating unit 121.

In the next step S305, processing for calculating the feature amount is performed. The feature amount calculating unit 121 calculates a sum value from the pixel values at the four vertices of the local regions of the processing windows, and calculates the feature amount using the parameters set in step S303. This calculation is performed for each processing window within the window group. The calculation of the feature amount is, for example, normalization using the obtained sum value in some cases, or multiplication of the sum value by the coefficient, in other cases. Alternatively, the sum value itself is used as the feature amount in still other cases. Thereafter, the result of the feature amount calculation is transmitted to the determination processing unit 122.

In the next step S306, processing for determining the result is performed. The determination processing unit 122 performs determination using the result of the feature amount calculation and the parameters set in step S303. Determination processing is, for example, processing for performing non-linear conversion using a Look Up Table (LUT) on a value obtained by performing a product-sum operation using one or a plurality of feature amounts, comparing it with a predetermined threshold value, and outputting the result. The set parameters are a coefficient value, LUT data, and a threshold value, and determination processing is performed based on the result of the feature amount calculation: for example, "True determination" is obtained if the result is higher than the set threshold value, and "False determination" is obtained if the result is lower than the threshold value. The determination processing is performed for each processing window within each window group. In the present embodiment, if False determination is obtained in this determination, the determination that a predetermined detection pattern is not present in the processing window is confirmed (hereinafter, "False confirmation").

In the next step S307, it is checked whether or not the identification processing has been finished in all local regions in each processing window within the window group. This step is performed in a processing window for which the "True" determination is obtained in step S306. If any local region to be a processing target next remains, the identification processing control unit 119 returns to step S302. Then, processes in steps S302 to S306 are repeated for all local regions. At this time, in the processes in steps S302 to S306, only the processing window for which True determination was obtained in step S306 needs to be processed. After True determination is obtained in all local regions, it is confirmed that the predetermined detection pattern is present (hereinafter, "True confirmation"). After the True confirmation or the False confirmation is obtained in each processing window within the window group, the identification processing ends, and processing proceeds to step S308.

Next, in step S308, a window group end notification is given. The identification processing control unit 119 notifies the processing window management unit 123 that processing has ended. The processing window management unit 123 that received the notification starts processing for preparing the next window group. Information regarding the processing window for which the True confirmation was obtained is written in the external memory 104 via the bus interface 111 by the identification processing control unit 119. On the other hand, information regarding the processing window for which the False confirmation was obtained is not written.

Next, in step S309, it is checked whether or not the identification processing has been finished for all window groups. If processing has not been finished for all window groups, processing proceeds in the direction of the "False" arrow, and processing for the next window group is performed. On the other hand, if processing has been finished for all window groups, processing proceeds in the direction of the "True" arrow.

The above-described pattern identification processing is repeated over all window groups in the input image information, and after processing is finished, processing proceeds to step S205.

Next, in step S205, post-processing is performed. The identification processing control unit 119 notifies the CPU 101 that the pattern identification processing has been finished for all window groups. The above is the overall flow of the pattern identification processing.

Next, the method for distributing the accumulated image information to the memories and the principle of parallel reading will be described. First, the method for distributing the accumulated image information to the memories in accordance with a predetermined rule will be described.

Figure 4:
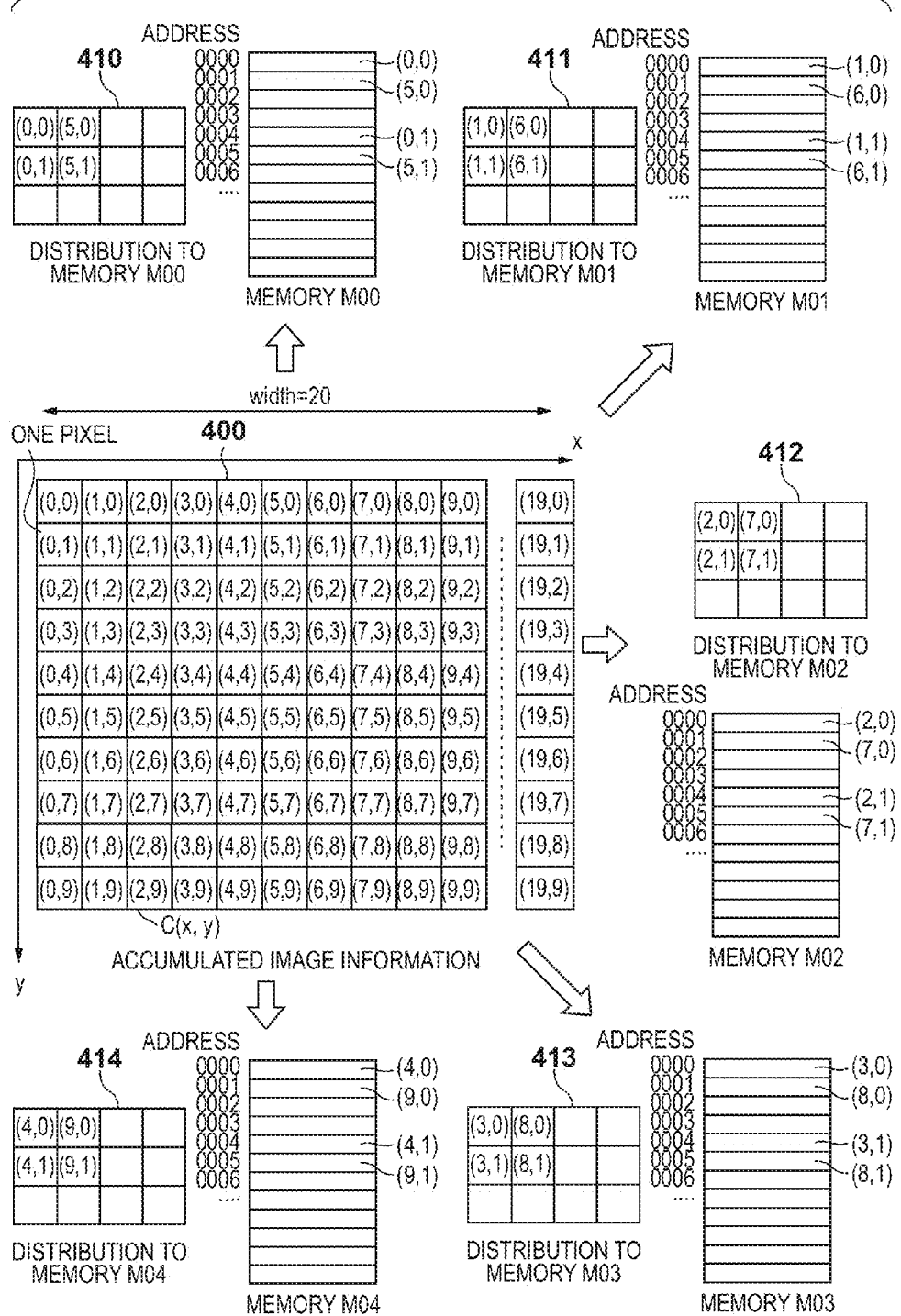
FIG. 4 is a diagram illustrating assignment to memories whose number is $P_1=5$ and $P_2=1$ according to the first embodiment.

FIG. 4 is a diagram illustrating assignment to memories whose number is $P_1=5$ and $P_2=1$. In FIG. 4, reference numeral 400 denotes accumulated image information C(x, y). Here, assuming that the upper left corner of the accumulated image information 400 is an origin and the horizontal direction and the vertical direction are an x direction and a y direction, respectively, coordinates of each pixel is represented as (x, y). The coordinate of the origin is (0, 0). One box in the accumulated image information 400 indicates an accumulated image information value corresponding to specific coordinates. Reference numerals 410 to 414 in FIG. 4 are data on the memories that is expressed two-dimensionally, and the figure on the right side indicates images of storage in the physical memories. The values of (x, y) appearing in the two-dimensional expression of data on each memory and the image of storage in the physical memories indicate corresponding coordinates of the accumulated image information 400. The data 410 to 414 on the memories are in two-dimensional arrays in which distributed image data are rearranged so as to be close together centered about the respective origin coordinates. For example, pixels at coordinates (0, 0), (5, 0), (0, 1), and (5, 1) of the accumulated image information 400 are rearranged so as to be adjacent, thereby forming the two-dimensional array denoted by reference numeral 410.

Next, a description will be given of a generalized method for distribution to the memories in accordance with the predetermined rule according to the first embodiment.

The pixel value of coordinates (x, y) of the accumulated image information 400 is represented as C(x, Y). The memories M00 to M($P_2-1$) ($P_1-1$) are assigned into a two-dimensional configuration as shown in FIG. 16. $P_1$ indicates the number of memories in the x direction, and $P_2$ indicates the number of memories in the y direction. Also, each memory is represented as $M_{p2p1}$. p1 and p2 indicate memory numbers with 0 as the starting point, and indicate memory number values in the horizontal and vertical directions, respectively.

C(x, y) being stored at an address on the memory $M_{p2p1}$ is represented as follows.

$$M_{p2p1}[\text{address}]=C(x,y) \quad (3)$$

Here, the memory numbers p1 and p2 of memories in which the pixel value of coordinates (x, y) is stored are represented as expressions below.

$$p1=x \% P1 \quad (4)$$

$$p2=y \% P2 \quad (5)$$

(Note: the arithmetic symbol "%" indicates a modulo arithmetic.)

Coordinates (x', y') on the memory $M_{p2p1}$ is represented as expressions below.

$$x'=x/P1 \quad (6)$$

$$y'=y/P2 \quad (7)$$

(Note: the fractional portions of x' and y' are rounded down.)

Also, assuming that the width of an image stored in the memory $M_{p2p1}$ is defined as m_width, m_width can be expressed as an expression below from the width of the accumulated image information 400 and the value of P1.

$$m\_width=width/P1 \quad (8)$$

(Note: the fractional portion of m_width is rounded up to an integer.)

The address on the memory $M_{p2p1}$ for storage is expressed by an expression below.

$$address=m\_width*y'+x' \quad (9)$$

The above is the method for distributing the accumulated image information to the memories that is generalized with the expression.

Next, a description will be given, using FIG. 4, of a specific case where the number of memories assigned in the x direction is 5 (P1=5) and the number of memories assigned in the y direction is 1 (P2=1). Here, assuming that the image width of the accumulated image information 400 is width=20, the width of the image stored in the memory $M_{p2p1}$ is m_width=4 since P1=5. Based on the above, the accumulated image information 400 on the respective coordinates is distributed on the corresponding memories.

For example, regarding the memory for storing C(8, 1), p1=3 and p2=0 from expressions (4) and (5), x'=1 and y'=1 from expressions (6) and (7), and address=5 from expression (9). As a result, expression (3) is represented as M03=C(8, 1), and the value of C(8, 1) is stored at address=5 on the memory M03.

Further, if a local region is located above the upper end or left end of the accumulated image information, the local region is C(-1, *) or C(*, -1), respectively. In this case, the respective values are C(-1, *)=0 and C(*, -1)=0. "*" means "don't care", and may be any kind of value. The above is the method for distributing the accumulated image information to the memories according to the present embodiment.

Next, the principle of parallel reading of the present embodiment will be described. To perform parallel reading simultaneously from a plurality of memories, an exclusive relationship needs to be established so that the memories to be read during each time of parallel reading are all different. The important condition here is to establish a coprime relationship between an interval (hereinafter referred to as a stride) between adjoining processing windows and the number of memories assigned to each dimension.

In the present embodiment, the number of memories in the x direction is 5, the stride is 4 pixels, thereby establishing a coprime relationship. The reason why a coprime relationship needs to be established will be described using FIG. 17. In FIG. 17, a one-dimensional array is employed to facilitate understanding. First, a case will be considered where data in a one-dimensional array is assigned to five memories, and five sets of data that are consecutive at certain strides are read in parallel. Tables 1701 to 1707 in FIG. 17 show the cases where 5 sets of data are read from coordinates 0 at an interval of 1 to 7 strides, when the data is distributed by the method for distribution to the memories of the present embodiment. The memories to be read when the stride is changed from 1 to 7 are shown in black. In the tables, M00 to M04 in the first row are the memory numbers, and values in the second and subsequent rows are x-coordinate values of the one-dimensional data. For example, the data of x=6 is stored at the address=1 on the memory number M01. Next, a description will be given by taking the table 1704 with stride=4 as a representative. Assuming that the first read data to be read is data at address=0 (x=0) on the memory number M00, the next read data is located at the position with coordinates shifted by +4, which is at address=0 on the memory number M04. Then, the still next read data is located at the position with coordinates further shifted by +4, which is at address=1 on the memory number M03. From the result obtained by repeating this, it is found that if five points are consecutively read from the starting point being 0 with stride=4, an exclusive relationship is established between all memories to be read. Here, it is a remarkable characteristic that the memories to be read are always in an exclusive relationship, regardless of where the top coordinates are shifted. It is a characteristics achieved when the number of memories and the stride are in a coprime relationship. In FIG. 17, it can be confirmed that all memories to be read are similarly in an exclusive relationship, except in the case of stride=5, where the number of memories in the x direction and the stride are not in a coprime relationship. It also applies to the case where the stride is 8 or larger, if the number of memories and the stride are coprime. A characteristic similar to the above characteristic is achieved also in the case where the data is extended into two-dimensional data.

Figure 5A:
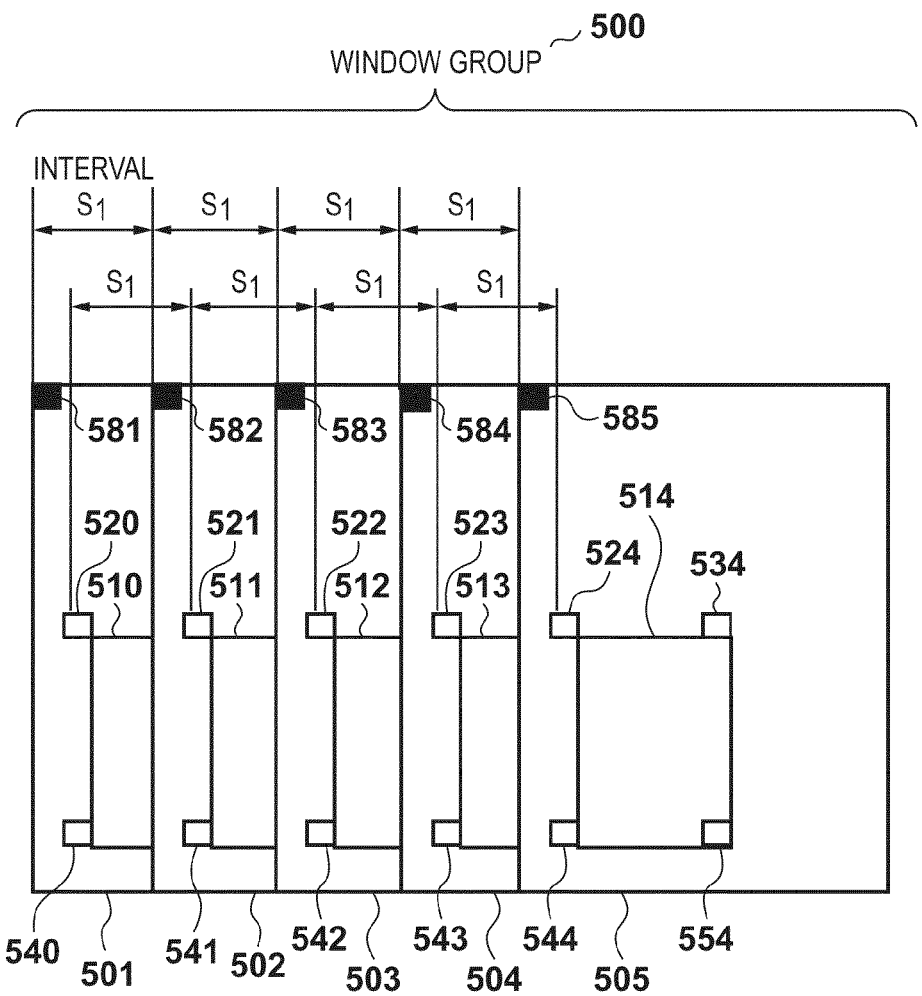
FIGS. 5A and 5B are diagrams illustrating a relationship between processing windows, local regions, and read data according to the first embodiment.
Figure 5B:

Next, the correspondence relationship with the actual processing windows will be described using FIGS. 5A and 5B. FIG. 5A is a diagram showing a positional relationship between the processing windows, the local regions, and read pixels. The window group 500 in FIG. 5A is constituted by the processing windows 501 to 505. Reference numeral 581 denotes a reference point of the processing window 501, and this reference point is the upper left corner of the processing window. Also, reference numerals 582 to 585 denote the respective reference points of the processing windows 502 to 505. Local regions 510 to 514 of each processing window each have four vertices. Four vertices of the local region 510 includes vertices 520 and 540, which are shown in FIG. 5A, and pixels 530 and 550 respectively at the upper right corner and the lower right corner of the rectangle, which are not shown in FIG. 5A (and are shown in FIG. 5B). Also, the four vertices of the local region 511 are vertices 521 and 541, which are shown in FIG. 5A, and pixels 531 and 551 respectively at the upper right corner and the lower right corner of the rectangle, which are not shown in FIG. 5A. Also, the four vertices of the local region 512 are vertices 522 and 542, which are shown in FIG. 5A, and pixels 532 and 552 respectively at the upper right corner and the lower right corner of the rectangle, which are not shown in FIG. 5A. Also, the four vertices of the local region 513 are vertices 523 and 543, which are shown in FIG. 5A, and pixels 533 and 553 respectively at the upper right corner and the lower right corner of the rectangle, which are not shown in FIG. 5A. Also, the four vertices of the local region 514 are vertices 524, 534, 544, and 554, which are shown in FIG. 5A.

Since the local regions to be processing targets are the same region in the respective processing windows, the local regions are located at the same position relative to the reference points 581 to 585 of the respective processing windows, as with the local regions 510 to 514. Since the processing windows are arranged at an equal interval of a distance of S1 pixels, the local regions are also arranged at an equal interval of the distance of S1 pixels, and pixels 520 to 524 are also arranged at an equal interval of the distance of S1 pixels. Thus, the state in which pixels are arranged at an equal interval is associated with the stride described in FIG. 17, and certain strides satisfy the reading condition. Accordingly, in the case of S1=4 for example, if the accumulated image information is interleaved and stored in P1=5 memories, pixels 520 to 524 can be read in parallel. FIG. 5B shows a time chart of reading of pixels in parallel. Values 520 to 554 in FIG. 5B indicate pixel numbers of the four vertices of the local regions shown in FIG. 5A.

FIG. 5B shows that the pixels 520 to 524 are read simultaneously from the memories M00 to M04 at time t0. Similarly, the pixels of the remaining vertices are also read simultaneously at time t1, t2, and t3.

Also, it can be understood in FIG. 5B that the pixels values of the vertices of five local regions can be obtained by reading four times in the respective memories. Regarding the speed performance at this time, if one execution of reading takes 1 cycle, the throughput per local region is 4/5=0.8 cycles.

Although a coprime relationship is established when the stride is S1=4 and the number of memories is P1=5, another number of memories exist with which a coprime relationship is established with the stride of S1=4. For example, it may be P1=7, P1=9, or P1=13. This is effective in the case where further speedup is desirable, and the throughput can be improved by increasing the number of memories P1. For example, if P1=13, 13 processing windows can be processed in parallel. The throughput per local region at this time is 4/13=0.30 cycles.

It has been described above that parallel reading is enabled by establishing a coprime relationship between the number of memories and the stride, and speedup is thereby possible.

Also, according to the present embodiment, when processing the processing windows in parallel, focus is put on a specific processing window and vertices of each local region are read one by one, and therefore, the shape of the local regions is arbitrary. It means that the application of the present invention is not limited to the method of reading four vertices of rectangles from the accumulated image information, calculating a sum, and thus calculating a feature amount. For example, even with the method for performing pattern identification using a difference feature obtained by calculating a difference between two points within an image, parallel reading is possible if the pixels to be read are located at the same position relative to the reference points of the respective processing windows.

Figure 6:
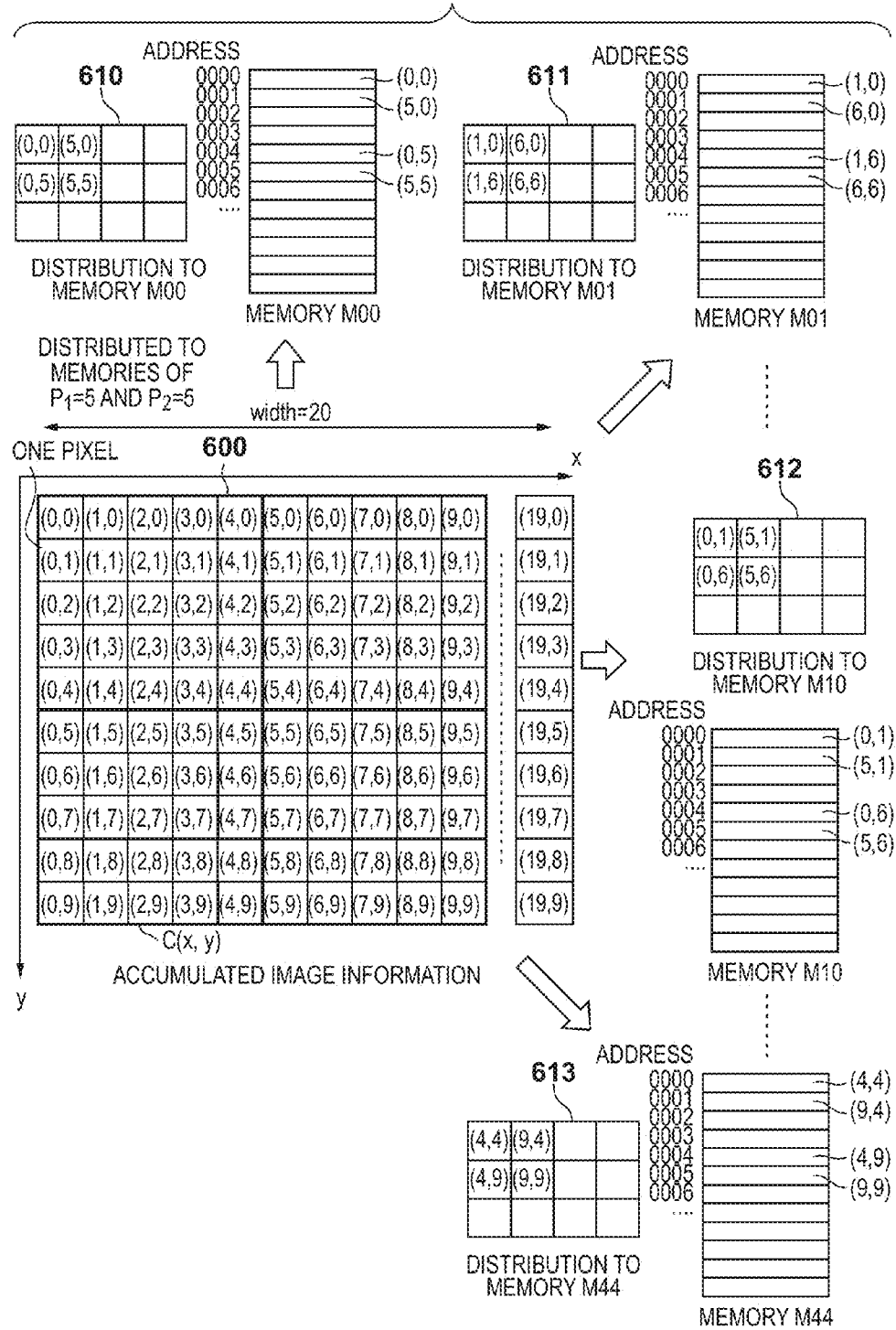
FIG. 6 is a diagram illustrating assignment to memories whose number is $P_1=5$ and $P_2=5$ according to the first embodiment.
Figure 7A:
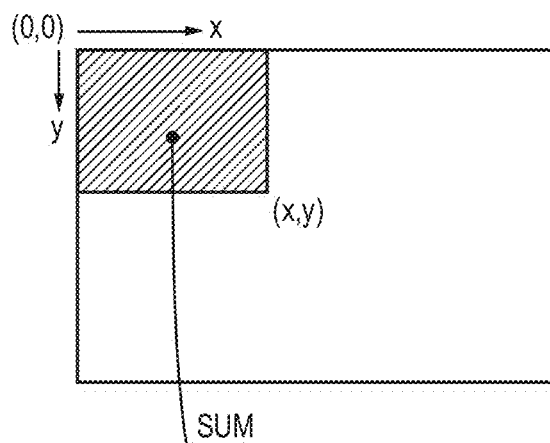
FIGS. 7A and 7B are diagrams illustrating a correspondence relationship of accumulated image information with respect to input image information.
Figure 7B:
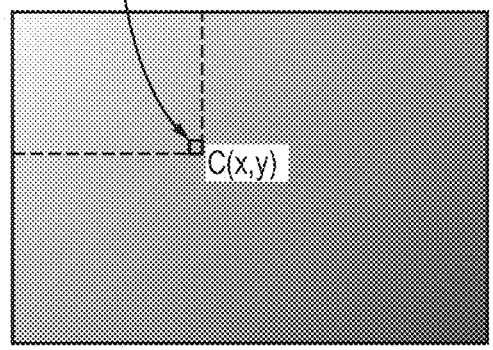
Figure 8:
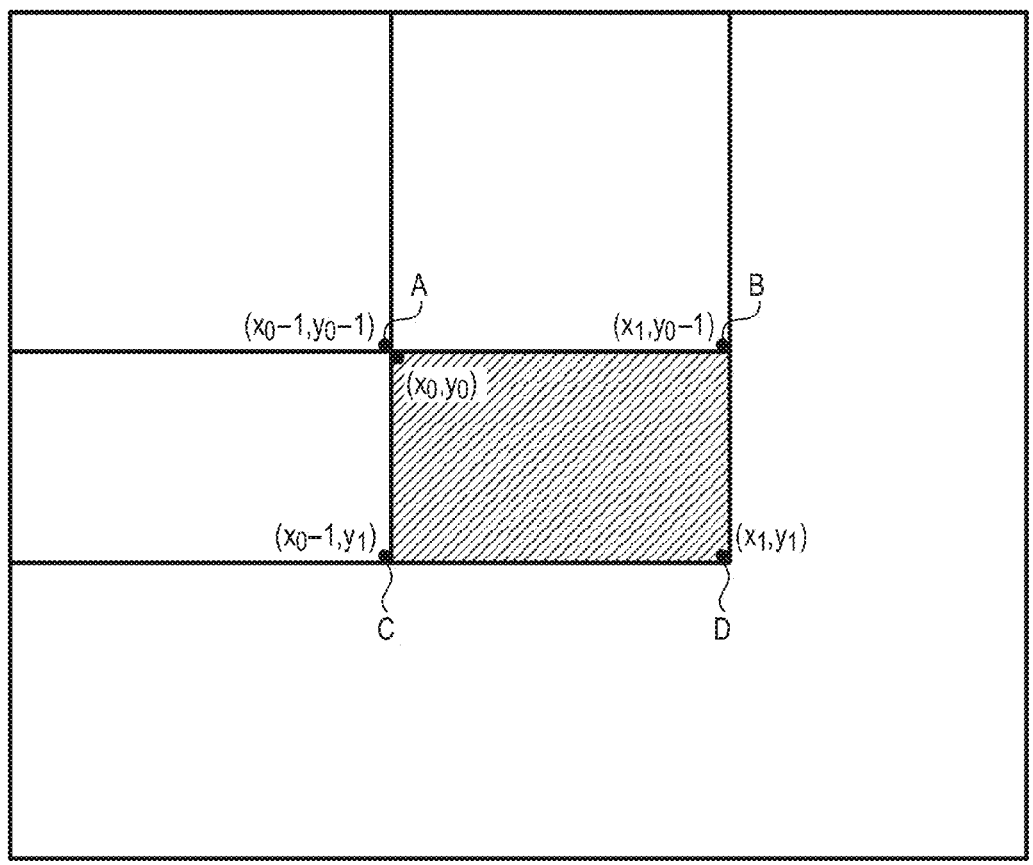
FIG. 8 is a diagram illustrating vertex coordinates to be read from accumulated image information for sum calculation.

Also, although the present embodiment described the method of interleaving the accumulated image information only in the horizontal direction with P1=5 and P2=1, the accumulated image information may be interleaved also in the vertical direction, as with P1=5 and P2=5. FIG. 6 shows an example in which the accumulated image information 600 is distributed to the respective memories, whose number is P1=5 and P2=5, by assigning the accumulated image information to the configuration of the memories M00 to M44. Reference numerals 610 to 613 shown therein denote two-dimensional expression of data in the respective memories. The calculation formulas for distributing the accumulated image information 600 to the respective memories are as indicated by expressions (3) to (9). In FIG. 6, the number of memories assigned in the x direction is 5 (P1=5), and the number of memories assigned in the y direction is 5 (P2=5). Also, assuming that the image width of the accumulated image information 600 is width=20, the width of the image to be stored in the memories is m_width=4 with P1=5. Based on the above, the accumulated image information 600 at the respective coordinates is assigned. For example, regarding the memory for storing C(5, 6), p1=0 and p2=1 from expressions (4) and (5), x'=1 and y'=1 from expressions (6) and (7), and address=5 from expression (9). As a result, expression (3) is represented as M10=C(5, 6), and the value of C(5, 6) is stored at address=5 on the memory M10. As described above, in the case where the accumulated image information 600 is distributed, 25 processing windows can be parallelized, and a window group has a configuration in which five processing windows are arranged in the horizontal direction and fixe processing windows are also arranged in the vertical direction.

Although an input to the pattern identifying unit 107 is image information and accumulated image information is created inside in the present embodiment, the input may be accumulated image information that is created in advance. In this case, the generating unit 112 may output the input as is to the distribution writing processing unit 113. Also, the generating unit 112 may have a configuration in which it is separate from the pattern identification unit 107 and is connected directly to the bus interface 111 and the distribution writing processing unit 113.

Although the present embodiment described the reading of the accumulated image information, it is only because the data used in the feature amount calculation processing is the accumulated image information, and the data to be read is not limited to the accumulated image information. If the information used in the feature amount calculation processing is image information, it may be a method of storing the image information in the memories and reading it therefrom.

Although the calculation method using expressions (4) to (9) for calculating p1, p2, and the address in expression (3) has been described in the present embodiment, the present invention is not limited thereto. In the present invention, it is important to establish a coprime relationship between the number of assigned memories and the interval between adjoining processing windows.

Although the present embodiment describes the two-dimensional arrangements of the memories as shown in FIG. 16, they are logical arrangements and do not limit the physical arrangements. Also, even if the number of physical memories is larger than P1×P2, P1×P2 memories among them may be logically assigned and used.

Although the present embodiment described the example in which identification processing is aborted if the False confirmation is obtained, the present invention may alternatively employ identification processing that is not aborted in the middle.

Second Embodiment

In a second embodiment, a description will be given of a method of interleaving accumulated image information in the x direction into a plurality of memories and, regarding the y direction thereof, changing the phase of an interleaving order in the x direction in accordance with the position. Thus, it will be described that parallelization is possible also in a special arrangement of processing windows.

Figure 18A:
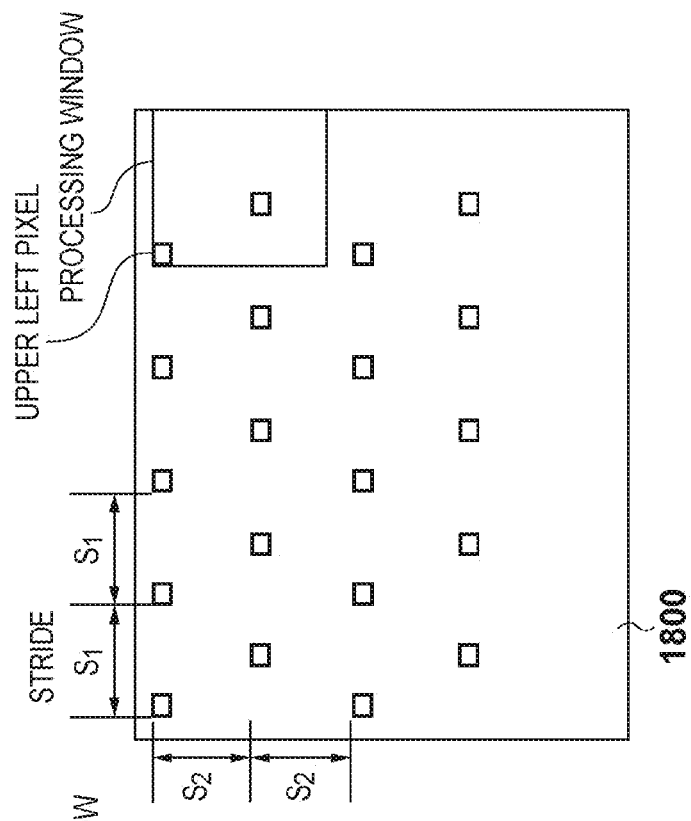
FIGS. 18A and 18B are diagrams illustrating arranging of processing windows in a reticular pattern and in a houndstooth pattern, respectively, according to the second embodiment.
Figure 18B:
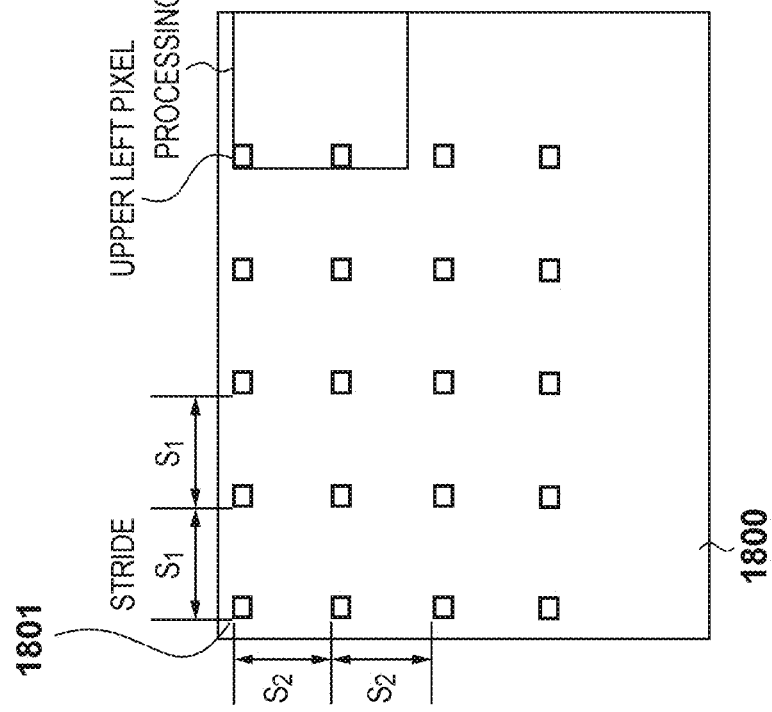

FIGS. 18A and 18B show exemplary special processing window arrangements. FIGS. 18A and 18B show only the upper left reference points of the processing windows for the purpose of explanation. FIG. 18A shows a processing window arrangement in a reticular pattern. The example of arranging processing windows in a reticular pattern has also been shown in the first embodiment.

The processing windows are arranged at an interval of strides S1 and S2 respectively in the horizontal and vertical directions from a starting point 1801 of the arrangement. Next, as a special processing window arrangement, the arrangement in a houndstooth pattern is shown in FIG. 18B. The details for parallelizing the processing windows arranged in a houndstooth pattern will be described later.

Some parts of the second embodiment are the same as the first embodiment, and only the differences therebetween will be described. The configuration of the pattern identifying apparatus of the second embodiment is the same as that of the first embodiment shown in FIG. 1. However, the distribution writing processing unit 113 is different. The parameters for the memory configuration of the second embodiment are P1=5 and P2=1, and the distribution writing processing unit 113 performs processing for changing the phase of distribution calculation in accordance with the position in the y direction and changing the memories to be distribution targets.

Figure 19A:
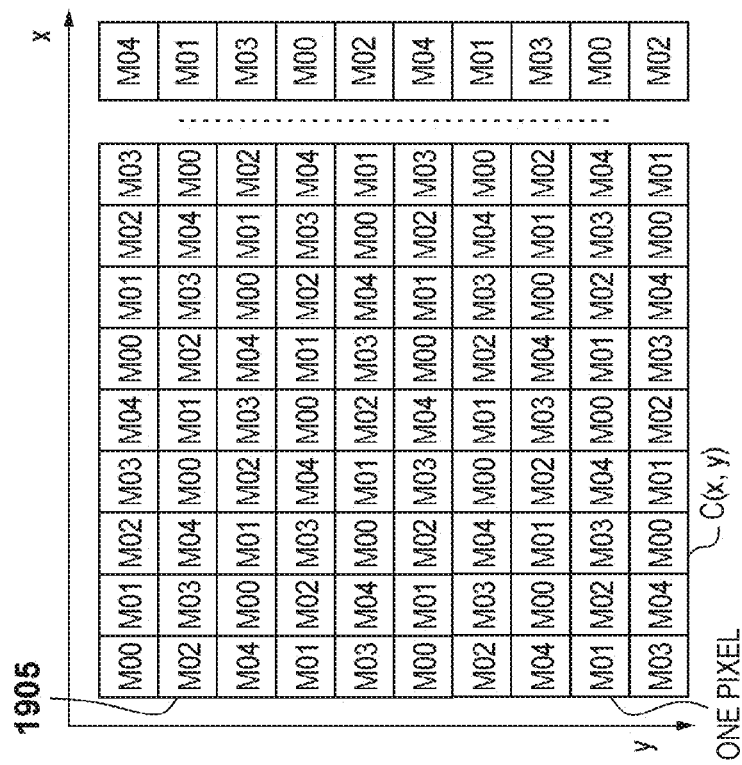

A method for distribution to the memories while changing the phase and the effect thereof will be described using FIGS. 19A to 19F. FIG. 19A shows an example of distribution using the method of the first embodiment, and FIG. 19B shows an example in which the phase is changed by +2 in accordance with the position in the y direction.

Figure 19B:
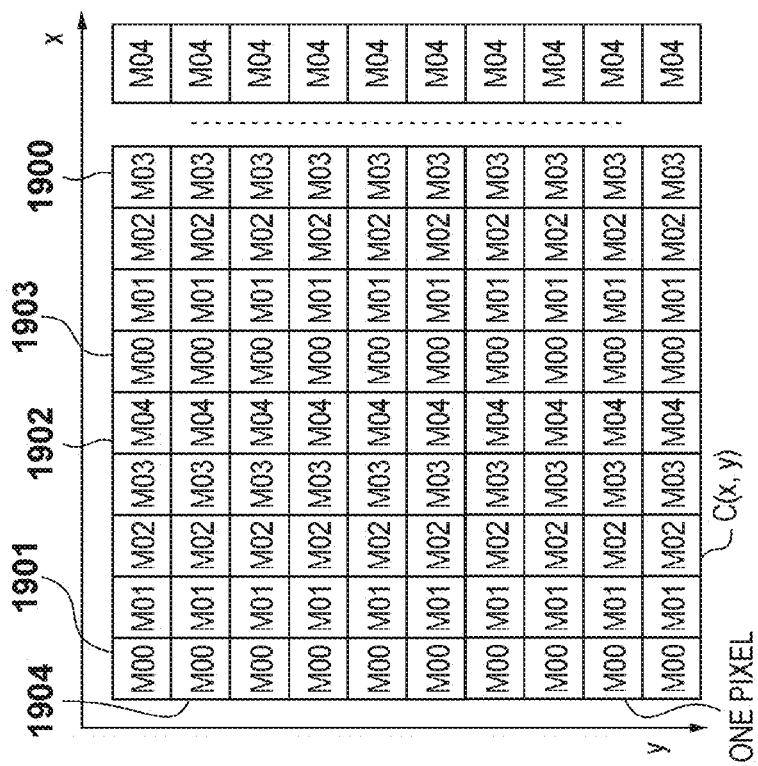

Generalized expressions for distribution of the accumulated image information of FIG. 19B are shown below. The expressions are almost the same as expressions (3) to (9) of the first embodiment, while expressions (4) and (5) for determining the memory number are different. Here, only the difference will be described.

The phase in the x direction and the phase in the y direction are represented as phase 1 (phase 1 is an integer) and phase 2 (phase 2 is an integer), respectively, and the memory numbers $p_1$ and $p_2$ of a memory for storing a pixel value of coordinates (x, y) are expressed as expressions below.

$$p_1 = (x + y * \text{phase } 1) \% P_1 \quad (10)$$

$$p_2 = (x * \text{phase } 2 + y) \% P_2 \quad (11)$$

(Note: "%" indicates a modulo arithmetic.) Expression (10) is an expression obtained by taking the phase into account in expression (4), and expression (11) is an expression obtained by taking the phase into account in expression (5).

Changing the phase by +2 in accordance with the position in the y direction in FIG. 19B is equal to phase 1=2 and phase 2=0. FIG. 19A is a diagram showing assignment to the memories having a configuration with $P_1=5$ and $P_2=1$ using the method of the first embodiment, thereby distributing the accumulated image information to the memories. A pixel 1901 in the accumulated image information is stored in the memory M00, and pixels up to a pixel 1902 are stored in the memories up to the memory M04 in order. The next pixel 1903 is stored in the memory M00, and such storage is repeated up to the right end. A top pixel 1904 in the lower row is stored in the memory M00 as in the first row. FIG. 19B is a diagram in which the accumulated image information is stored in the memories with P1=5 and P2=1 while changing the phase in accordance with the position in the y direction. The first row is the same as in FIG. 19A, while a top pixel 1905 in the second row is stored in the memory M02, and the memory for storage shifts by +2 every time the position advances by one row in the y direction, unlike in FIG. 19A.

Next, the case of reading the memories in FIGS. 19A and 19B in a houndstooth pattern will be described using FIGS. 19C and 19D. In FIG. 19C, five pixels that are arranged in a houndstooth pattern are shown with a thick frame. The pixel positions with the thick frame correspond to the positions on the upper left side of the processing window. In the arrangement in a houndstooth pattern shown here, a pixel 1911 is located at the center of four surrounding pixels (1910, 1912, 1913, and 1914). In FIG. 19D as well, an arrangement in a houndstooth pattern is formed.

In FIG. 19C, the pixels 1910 and 1913 and the pixels 1912 and 1914 are stored respectively in the same memories, and therefore cannot be read in parallel. On the other hand, it can be understood that in FIG. 19D, all of the pixels 1920 to 1924 are stored in different memories, and therefore can be read in parallel. This means that overlap in the y direction is resolved by shifting the phase. If it can be confirmed that there is no overlap in the positional relationship between predetermined pixels as in FIG. 19D, pixels in this positional relationship can be read in parallel at any location. However, it does not mean that overlap is resolved however the phase is shifted. For example, if the phase is shifted by +1, an overlap occurs among the pixels 1922, 1921, and 1923 among the five points arranged in a houndstooth pattern shown in FIG. 19D. In other words, the phase needs to be adjusted based on the positional relationship between the pixels to be read. Although the adjusting of the phase in the arrangement in a houndstooth pattern as shown in FIG. 19D was described here, adjustment may be performed in a manner other than that shown in FIG. 19D, such as shifting the pixel 1921 by one pixel leftward or upward. What is important is to adjust the phase in a special arrangement so that pixel data can be read in parallel from this arrangement.

Figure 19E:
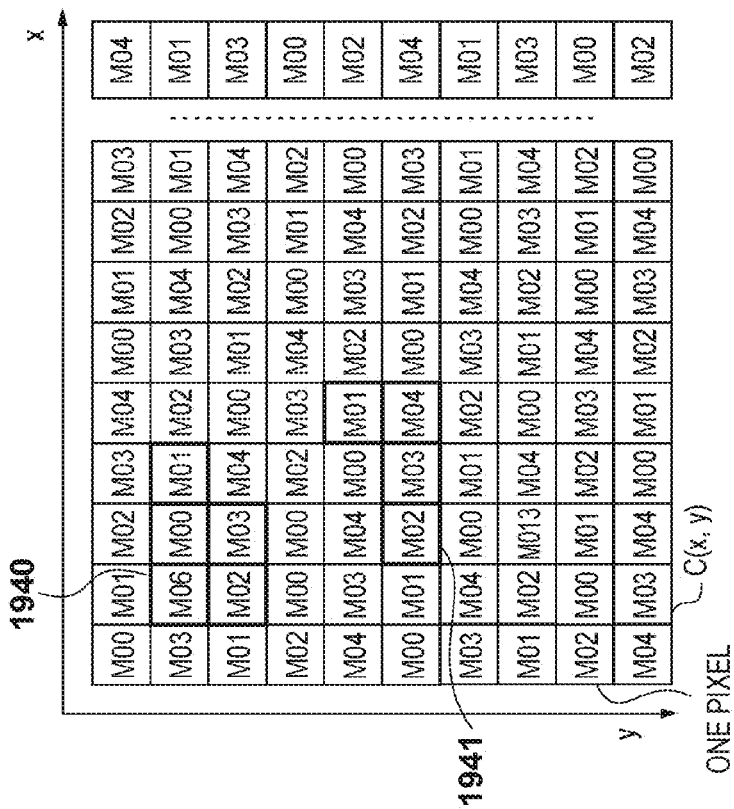
Figure 19F:
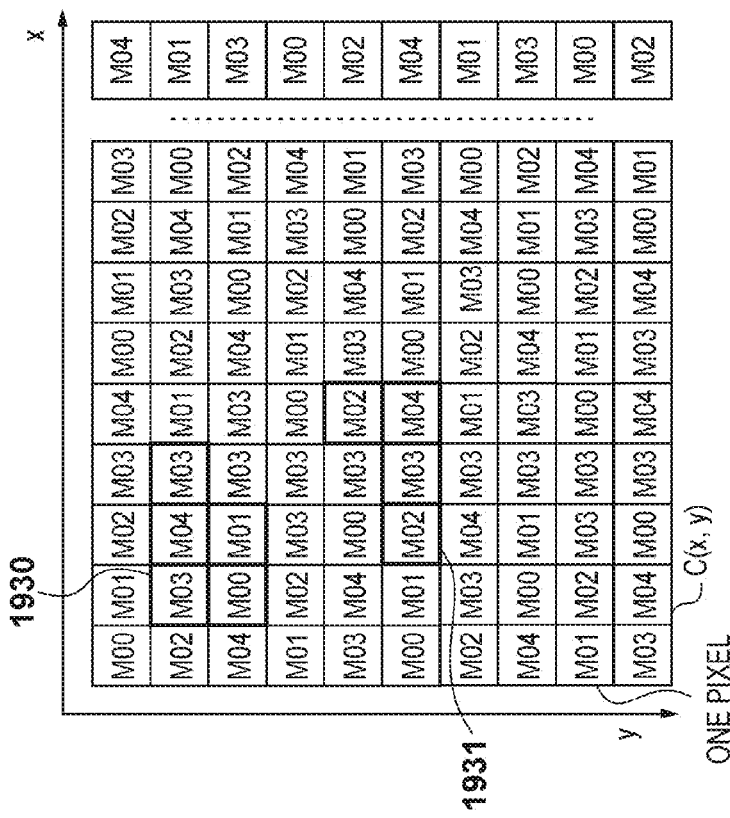

This can be understood also from reading when processing windows are arranged in a special positional relationship as shown next. FIGS. 19E and 19F show the manners of shifting the phase in the case where pixels in such special positional relationships as those denoted by reference numerals 1930 and 1931 are to be read in parallel. FIG. 19E is a diagram in which the phase is shifted by +2. It can be understood that some pixels in pixel groups 1930 and 1931 in a special positional relationship are stored in the same memory to be read. Meanwhile, FIG. 19F is a diagram showing a case in which the phase is shifted by +3. It can be understood that all pixels in pixels groups 1940 and 1941 in a special positional relationship are stored in the different memories to be read. Thus, it can be understood that parallel reading is possible by adjusting the phase.

As described above, the problem of overlap in the y direction is resolved by shifting the phase in accordance with the position in the y direction, thereby enabling parallel reading of pixel groups in various kinds of positional relationship. Although the phase is shifted in accordance with the position in the y direction in the second embodiment, shifting of the phase in the present invention is not limited to that in the y direction, and the phase may alternatively be shifted in accordance with the position in the x direction, as indicated by expression (11). Although the second embodiment described the case of arrangements in a houndstooth pattern and in special positional relationships, the phase may be changed in the window arrangement in a reticular pattern shown in the first embodiment. Also, the second embodiment described the case where the number of assigned memories is P1=5. Although this value is a prime number, the memory number P1 is not limited to a prime number. What is important is to establish an exclusive relationship so as to enable parallel reading by establishing a "coprime relationship" between a plurality of assigned memories and the interval between adjoining processing windows.

Although an input to the pattern identifying unit 107 is image information and the accumulated image information is created inside in the present embodiment, the input may be the accumulated image information that is created in advance. In this case, the generating unit 112 may output the input as is to the distribution writing processing unit 113. Also, the generating unit 112 may have a configuration in which it is separate from the pattern identification unit 107 and is connected directly to the bus interface 111 and the distribution writing processing unit 113.

Although the present embodiment described the reading of the accumulated image information, it is only because the data used in the feature amount calculation processing is the accumulated image information, and the data to be read is not limited to the accumulated image information. If the information used in the feature amount calculation processing is image information, it is possible to use a method in which the image information is stored in and read from the memories.

Third Embodiment

In the first and second embodiments, the examples of information in a two-dimensional array called accumulated image information have been described, while in a third embodiment, a description will be given of a method for application to information in a one-dimensional array. In the third embodiment, an input is data in a one-dimensional array, and the input data is referred to as one-dimensional input information.

The one-dimensional array of the third embodiment is distributed as shown in FIG. 12A. In FIG. 12A, the left end of one-dimensional input information 1200 is the starting point. Values that follow the symbol "#" in the data indicate coordinates relative to the starting point, which is 0. The configuration of the pattern identifying apparatus of the third embodiment is almost the same as that of the first embodiment, and the difference lies in that the accumulation information of input data is not created and that data to be handled is changed to data in a one-dimensional array. In order not to create the accumulation information, a configuration from which the generating unit 112 is removed can be employed. In another method, if the generating unit 112 has a function of outputting data as is, the generating unit 112 need only be operated to pass data.

Here, the method for assigning the one-dimensional array to the memories, which is the different from the first embodiment, and parallel reading will be described in detail.

First, the method for assigning one-dimensional input information to the memories will be described. A value of a coordinate (x) in the one-dimensional input information is represented as f(x). The number of memories assigned in the x direction is represented as $P_1$. Each memory is represented as $Mp_1$. $p_1$ indicates a memory number value.

The memory for storing f(x) is represented as follows.

$$Mp_1[\text{address}] = f(x) \quad (12)$$

The memory number $p_1$ of the memory in which the value of the coordinate (x) is stored is represented as an expression below.

$$p_1 = x \,\%\, P_1 \quad (13)$$

(Note: % represents modulo arithmetic.)
The address on the memory $Mp_1$ for storage is expressed by the expression below.

$$\text{address} = x/P1 \quad (14)$$

(Note: the fractional portion is rounded down in division.)
The above are the expressions for assigning the one-dimensional input information to the memories in accordance with a predetermined rule.

Next, a specific description will be given using FIGS. 12A and 12B. Consider the case where the one-dimensional input information 1200 of FIG. 12A is stored in five memories M0 (1270) to M4 (1274) shown in FIG. 12B. For example, the memory number of the memory for storing f(3) is the memory M3, according to expression (13). The address of the memory for storage is address=0, according to expression (14). As a result, expression (12) is expressed as M1=f(3), and the value of f(3) is stored at address=0 on the memory M3. Based on the above calculations, the one-dimensional input information 1200 is stored in the memories M0 (1270) to M4 (1274) in FIG. 12B.

Next, parallel reading will be described using FIG. 12A. Data 1210 corresponds to the processing window described in the first embodiment. The processing window 1210 consists of 10 sets of data, namely f(4) to f(13). Five processing windows are arranged at an interval of S1=3, as with the processing windows 1210 to 1214. Reference points of the respective processing windows are f(4), f(7), f(10), f(13), and f(16). At this time, data 1220 to 1224 that are located at the same position relative to these reference points can be read in parallel. This is because the data interval and the number of memories are in a coprime relationship. Since the interval S1 between adjoining processing windows and the data interval are the same, the data interval is 3. At this time, the one-dimensional input information is distributed to the five memories, and is in a coprime relationship. For this reason, if the data at these positions is read, a state is assured in which the data are stored exclusively in shadowed portions in the memories M0 to M4 in FIG. 12B, and thus, parallel reading is possible.

Although the present embodiment described a one-dimensional array that does not use the accumulation information, the accumulation information may be created from the one-dimensional array. In this case, processing can be performed with the configuration including the generating unit 112.

Fourth Embodiment

Figure 13:
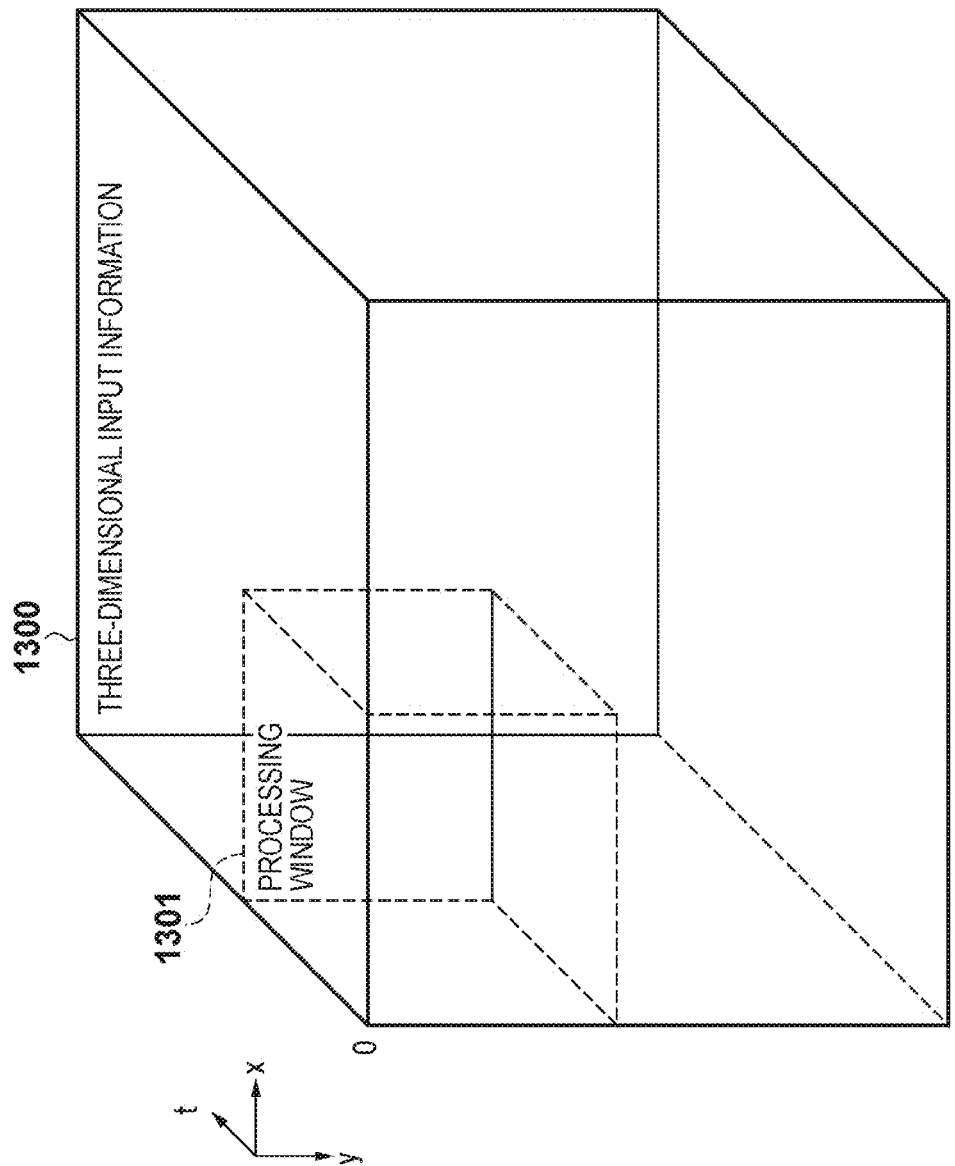
FIG. 13 is a diagram illustrating a three-dimensional array according to a fourth embodiment.

A fourth embodiment will be described using an example of application to three-dimensional information. In the fourth embodiment, an input is data in a three-dimensional array, and the input data is referred to as three-dimensional input information. For example, the three-dimensional input information is moving image information, and is formed as a result of one dimension, which is a time axis, being added to a two-dimensional image. The three-dimensional array of the fourth embodiment is shown in FIG. 13. The three-dimensional array 1300 has an origin 0 as a starting point, and the horizontal direction, vertical direction, and time of the image are represented as an x-axis, a y-axis, and a t-axis, respectively.

The configuration of the pattern identifying apparatus of the fourth embodiment is almost the same as that of the first embodiment, and the difference lies in that the accumulation information of input data is not created and that data to be handled is changed to data in a three-dimensional array. In order to not create the accumulation information, a configuration from which the generating unit 112 is removed can be employed. In another method, if the generating unit 112 has a function of outputting data as is, the generating unit 112 need only be operated to pass data. Here, the method for assigning the three-dimensional array to the memories, which is the difference from the first embodiment, and parallel reading will be described in detail.

First, the method for assigning the three-dimensional array to the memories will be described. A value of coordinates (x, y, t) in the three-dimensional array is represented as f(x, y, t). The number of memories assigned in the x direction, the number of memories assigned in the y direction, and the number of memories assigned in the t direction are represented as $P_1$, $P_2$, and $P_3$, respectively. The total number of assigned memories is $P_1 \times P_2 \times P_3$, and a memory is represented as $Mp_3p_2p_1$. $p_1$, $p_2$, and $p_3$ are memory numbers, where $p_1$ indicates a memory number in the x direction, $p_2$ indicates a memory number in the y direction, and $p_3$ indicates a memory number in the t direction.

The memory for storing f(x, y, t) is represented as follows.

$$Mp_3p_2p_1[\text{address}] = f(x,y,t) \tag{15}$$

The memory numbers p1, p2, and p3 of memories in which the pixel value of the coordinates (x, y, t) are stored are represented as expressions below.

$$p_1 = x \% P_1 \tag{16}$$

$$p_2 = Y \% P_2 \tag{17}$$

$$p_3 = t \% P_3 \tag{18}$$

(Note: % represents a modulo arithmetic.)

The address on the memory $Mp_3p_2p_1$ for storage is expressed as an expression below, where "width" is the width of the three-dimensional array, and "height" is the height thereof.

$$\text{address} = \left( \left( \frac{\text{width}}{P_1} \right) * \left( \frac{\text{height}}{P_2} \right) \right) * \left( \frac{t}{P_3} \right) + \left( \frac{\text{width}}{P_1} \right) + \left( \frac{y}{P_2} \right) + \left( \frac{x}{P_1} \right) \tag{19}$$

(Note: the fractional portions in division of width/$P_1$ and height/$P_2$ are rounded up to an integer, and the fractional portions in division of t/$P_3$, y/$P_2$, and x/$P_1$ are rounded down.

The above are the expressions for assigning the three-dimensional array to the memories in accordance with a predetermined rule.

Figure 14:
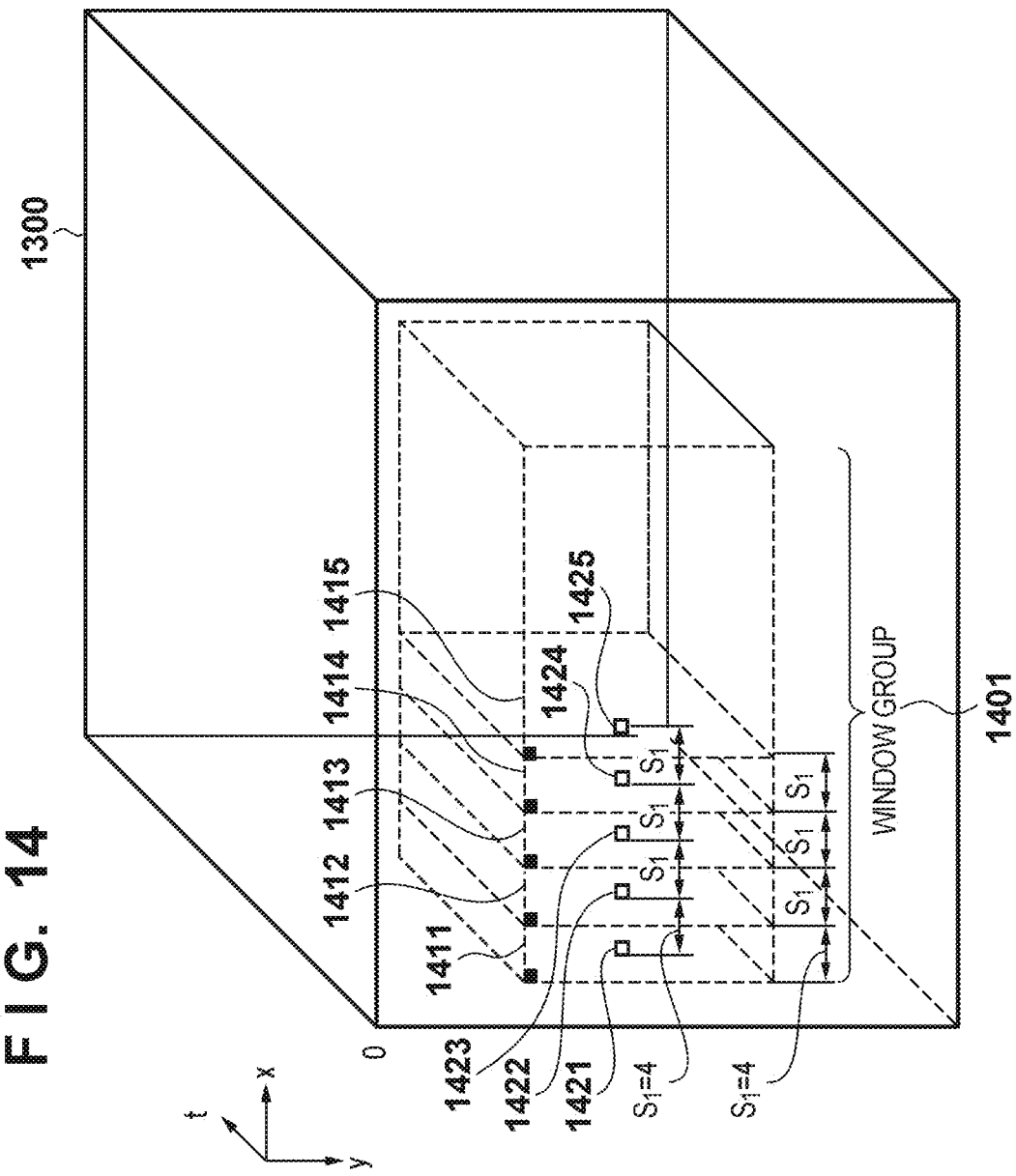
FIG. 14 is a diagram illustrating processing windows in the three-dimensional array according to the fourth embodiment.
Figure 15:
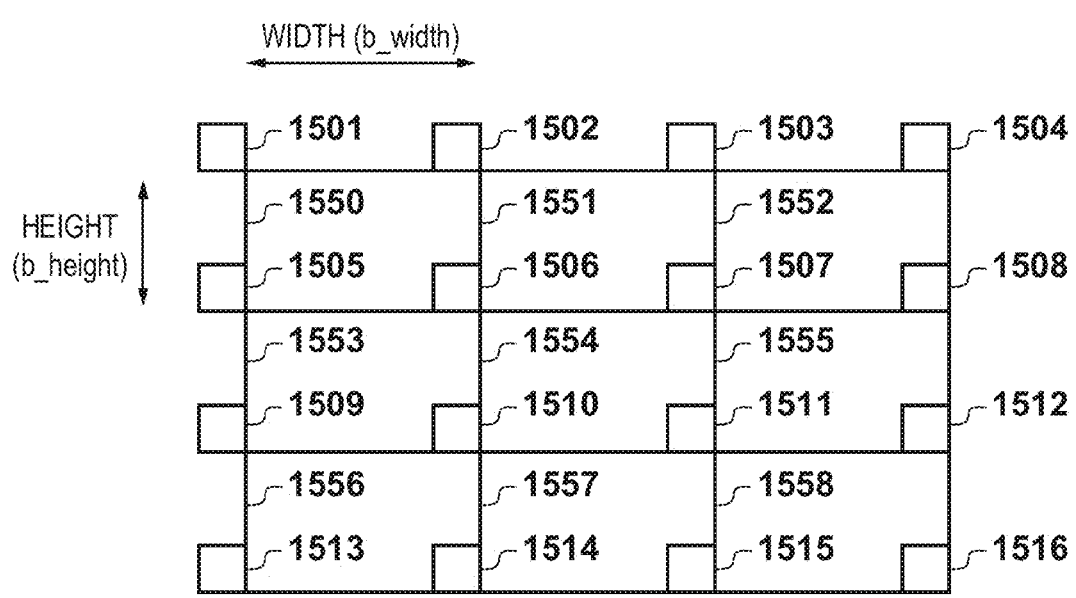
FIG. 15 is a diagram illustrating reading of 3×3 blocks for feature amount calculation.

Next, parallel reading will be described using FIGS. 13 and 14. It is considered that the three-dimensional array 1300 is stored in five memories with P1=5, P2=1, and P3=1. Reference numeral 1301 in FIG. 13 corresponds to the processing window described in the first embodiment. Hereinafter, reference numeral 1301 will be referred to as a processing window in the fourth embodiment. The processing window 1301 has the three-dimensional shape. Reference numeral 1401 in FIG. 14 corresponds to the window group described in the first embodiment. Hereinafter, reference numeral 1401 will be referred to as a window group. The processing windows are arranged at intervals of $S_1$, $S_2$, and $S_3$. $S_1$ is an interval between adjoining processing windows in the x direction, $S_2$ is an interval between adjoining processing windows in the y direction, and $S_3$ is an interval between adjoining processing windows in the t direction. FIG. 14 shows an example of an arrangement at the interval S1 in the x direction.

Also, consider the case where five processing windows 1411 to 1415 within the window group 1401 are arranged at an interval of S1=4 in the x direction. The processing windows are arranged only in the x direction to simplify the explanation. The window group may be formed by arranging the processing windows in the x, y, and t direction.

Reference points of the processing windows 1411 to 1415 are points located at vertices that are closest to the respective origins. At this time, points 1421 to 1425 that are located at the same position relative to the respective reference points can be read in parallel. This is because the data interval and the number of memories are in a coprime relationship. Since the interval S1 between adjoining processing windows and the data interval are the same, the data interval is 4. At this time, the three-dimensional input information is distributed to five memories, and is in a coprime relationship. For this reason, a state is assured in which the data at these positions are stored exclusively in the respective memories, thereby enabling parallel reading.

Although the present embodiment described the three-dimensional array that does not use the accumulation information, the accumulation information may be created from the three-dimensional array. In this case, processing can be performed with the configuration including the generating unit 112.

Fifth Embodiment

Figure 21A:
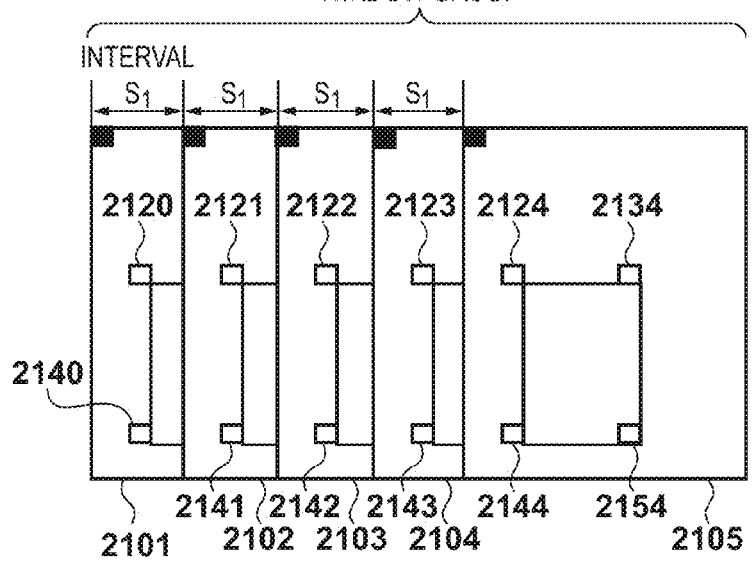
Figure 21B:
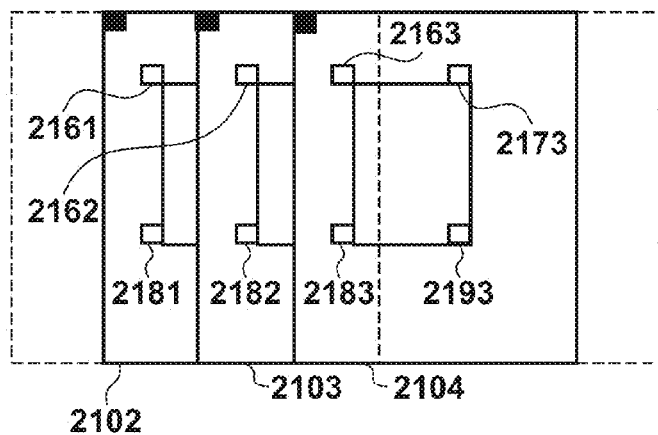

In the pattern identification processing described in the first embodiment, if it is confirmed (False confirmation) that a detection target does not appear in the result determination in step S306, the operation of aborting the identification processing in the current processing window is performed. FIGS. 21A and 21B are diagrams showing states in which processing in processing windows within a window group has been aborted. FIG. 21A shows the initial state of the window group, where a window group 2100 includes five processing windows 2101 to 2105 that are arranged at an interval of $S_1$ pixels. FIG. 21B shows a state in which it has been confirmed (False confirmation) after processing advances that the detection target does not appear in the processing windows 2101 and 2105 and processing has been aborted.

Next, four vertices in local regions in FIGS. 21A and 21B will be described. Four vertices of local regions in FIG. 21A are denoted by reference numerals 2120 to 2154, and are located at the same position relative to the reference points at the upper left corner of the respective processing windows. Four vertices of a local region in the processing window 2101 in FIG. 21A are denoted by reference numerals 2120, 2130, 2150, and 2140 in clockwise order, including vertices not shown in FIG. 21A (among them, vertices 2130 and 2150 are shown in FIG. 21C). Four vertices of a local region in the processing window 2102 in FIG. 21A are denoted by reference numerals 2121, 2131, 2151, and 2141 in clockwise order, including vertices not shown in FIG. 21A (among them, vertices 2131 and 2151 are shown in FIG. 21C). Four vertices of a local region in the processing window 2103 in FIG. 21A are denoted by reference numerals 2122, 2132, 2152, and 2142 in clockwise order, including vertices not shown in FIG. 21A (among them, vertices 2132 and 2152 are shown in FIG. 21C). Four vertices of a local region in the processing window 2104 in FIG. 21A are denoted by reference numerals 2123, 2133, 2153, and 2143 in clockwise order, including vertices not shown in FIG. 21A (among them, vertices 2133 and 2153 are shown in FIG. 21C). Four vertices of a local region in the processing window 2105 in FIG. 21A are as shown therein. Four vertices of local regions in FIG. 21B are denoted by reference numerals 2161 to 2193, and are located at the same position relative to the reference points at the upper left corner of the respective processing windows. Four vertices of a local region in the processing window 2102 in FIG. 21B are denoted by reference numerals 2161, 2171, 2191, and 2181 in clockwise order, including vertices not shown in FIG. 21B. Four vertices of a local region in the processing window 2103 in FIG. 21B are denoted by reference numerals 2162, 2172, 2192, and 2182 in clockwise order, including vertices not shown in FIG. 21B. Four vertices of a local region in the processing window 2104 in FIG. 21B are as shown therein.

Next, a state of the reading of memories when the state of FIG. 21A transitions to the state of FIG. 21B is shown in a time chart of FIG. 21C. Here, it is assumed that memories of $P_1=5$ are assigned, and the accumulated image information is distributed to the memories according to expressions (3) to (9) for distribution described in the first embodiment. In FIG. 21C, data in local regions 2120 to 2154 is read in parallel from all of the memories M00 to M04 from time t0 to time t3. Next, processing in the processing windows 2101 and 2105 is aborted after time t3, and thereby, data in local regions 2161 to 2193 is read from time t4. From time t4 to time t7, only the data in local regions in the processing windows 2102, 2103, and 2104 is read, and therefore, reading is performed only from the memories M01, M02, and M03. Here, if the number of processing windows with the False confirmation further increases, the number of memories from which reading is not performed also increases, resulting in lower memory access efficiency.

Figure 22:
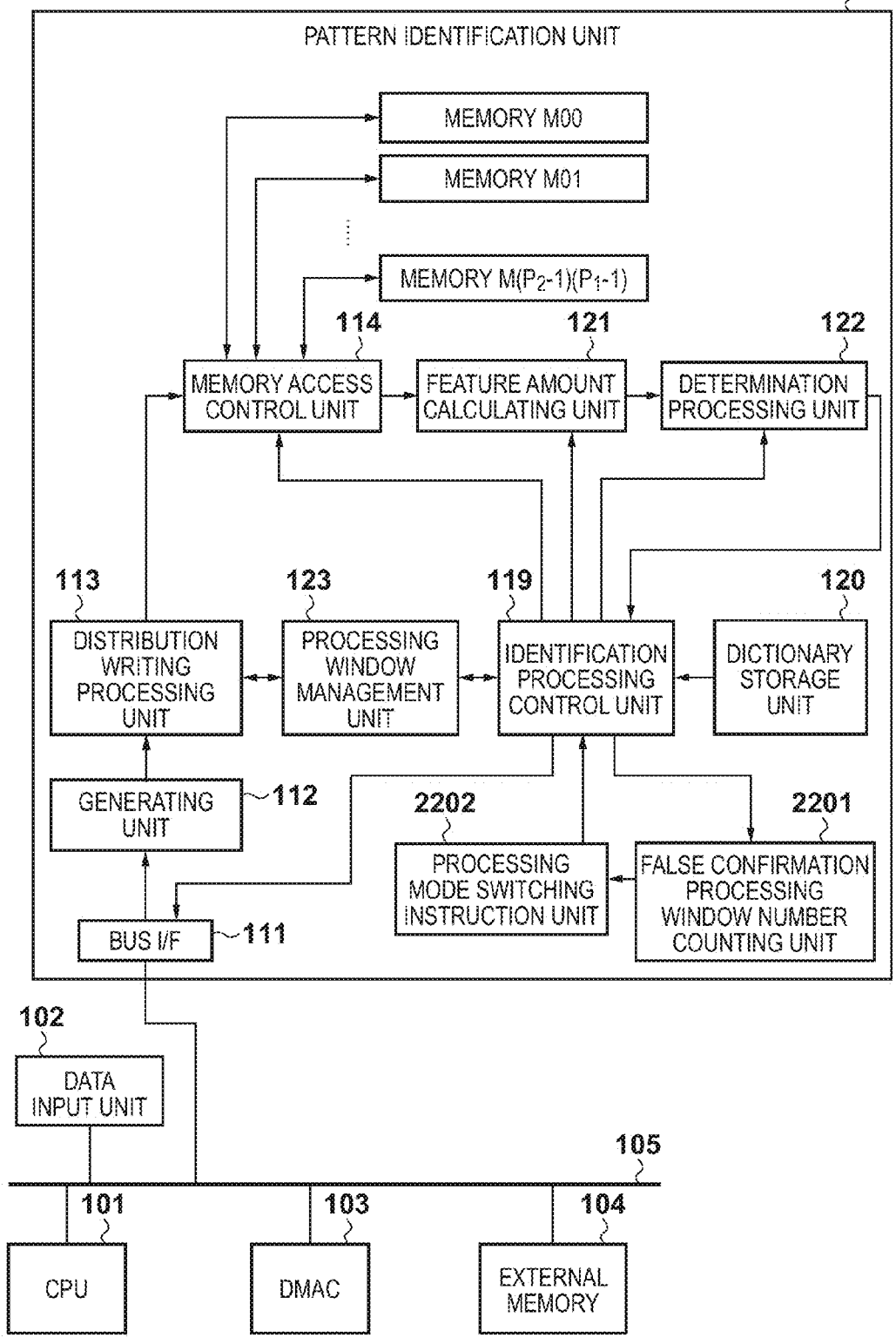
FIG. 22 is a block diagram showing a configuration of a pattern identifying apparatus according to the fifth embodiment.

In the fifth embodiment, a method for reducing the number of memories from which reading is not performed to the minimum will be described. FIG. 22 is a diagram showing a configuration of pattern identification of the fifth embodiment. It is basically the same as the configuration of the first embodiment illustrated in FIG. 1. The configuration of the present embodiment is the configuration of FIG. 1 to which a False confirmation processing window number counting unit 2201 and a processing mode switching instruction unit 2202 are added. Next, the operation will be described using a flowchart of FIG. 23.

Figure 23:
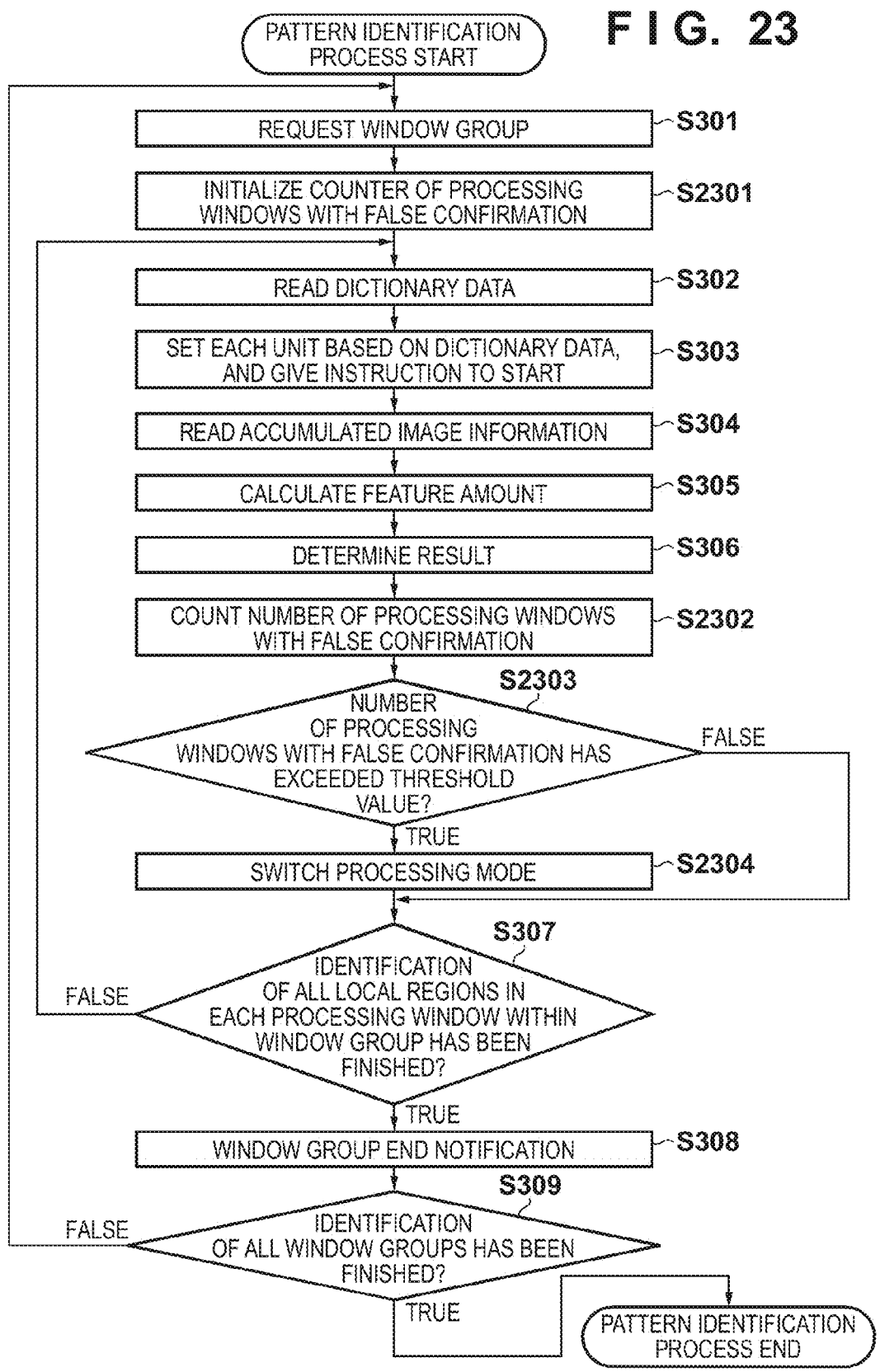
FIG. 23 is a flowchart of pattern identification processing according to the fifth embodiment.

The flowchart of FIG. 23 is basically the same as the flowchart of FIG. 3 of the first embodiment, but is different in that steps S2301 to S2304 are added. These steps will be described below.

In step S2301, a counter for counting processing windows with the False confirmation is initialized. Initialization means setting the count value of the False confirmation processing window number counting unit 2201 to 0. Next, in steps S302 to S306, the same processing as that of the first embodiment is performed. Next, in step S2302, processing for counting the number of the processing windows for which the False confirmation was obtained in step S306 is performed. The False confirmation processing window number counting unit 2201 is for counting the number of processing windows for which False confirmation was obtained, and performs counting upon receiving a False confirmation notification from the identification processing control unit 119.

Next, in step S2303, it is checked whether or not the number of the processing windows with the False confirmation exceeds a threshold value. The False confirmation processing window number counting unit 2201 has notified the processing mode switching instruction unit of the count value. Then, the processing mode switching instruction unit 2202 compares the received count value with the threshold value that is set in advance through register settings or the like, proceeds to next step S2304 if the received count value is larger than or equal to the threshold value, and gives the identification processing control unit 119 an instruction to switch a processing mode. If the received count value is smaller than the threshold value, it proceeds to step S307. In the case where the switching of the processing mode has not occurred, the same operation as that of the first embodiment will be performed.

Next, the case where the switching of the processing mode occurs will be described. In the first processing mode, which serves as a first read processing mode, data in local regions in processing windows within a window group is read in parallel, as in the first embodiment. Then, in the other processing mode to which the processing mode is switched in step S2304, which serves as a second read processing mode, four vertices in local regions in one processing window are read in parallel. In this mode, a coprime relationship is established between the number of memories into which an integral image is interleaved, the width of a block, and the height thereof, thereby reading four vertices of the local regions. These processing modes and the switching therebetween will be described using FIGS. 24A to 24C.

FIG. 24A is a diagram in which memories of $P_1=5$ (M00 to M04) are assigned, and the accumulated image information is distributed while the phase is shifted by +2 pixels in accordance with coordinates in the y direction. This is the distribution method described in the second embodiment. A window group 2400 is constituted by processing windows 2401 to 2405, and the interval $S_1$ between adjoining processing windows is four pixels. Each processing window here has the size of 16 pixels in the vertical direction and 16 pixels in the horizontal direction. M00 to M04 written in the pixels indicate memory numbers.

FIG. 24B is a diagram showing read positions in local regions in the first processing mode described in the first embodiment. A local region 2406 belongs to a processing window 2401. Similarly, a local region 2407 belongs to a processing window 2402, a local region 2408 belongs to a processing window 2403, a local region 2409 belongs to a processing window 2404, and a local region 2410 belongs to a processing window 2405. FIG. 25 shows a timing chart showing timings of reading four vertices of these local regions 2406 to 2410. First, at time t1, data located at upper left vertices of the five local regions 2406 to 2410 are read. Specifically, the data located at positions 2411, 2413, 2415, 2417 and 2419 is read. In the timing chart of FIG. 25, the memories from which the above data are read are shown at time t1. Similarly, data located at upper right vertices of the local regions is read in parallel at time t2, data located at lower left vertices of the local regions is read in parallel at time t3, and data located at lower right vertices of the local regions is read in parallel at time t4.

Next, FIG. 24C is a diagram showing positions at which four vertices of local regions in a processing window are read in parallel in the other processing mode after the processing mode is switched. FIG. 24C shows a state when the False confirmation has been obtained in processing in the processing windows 2401 and 2405 and the switching of the processing mode has occurred. FIG. 24C shows local regions 2450, 2460, and 2470 in a processing window 2402. The reading of four vertices of the local regions in the processing window in parallel corresponds to the reading of image data located at 2451, 2452, 2453, and 2454, which are data at the four vertices of the local region 2450 in parallel. This is indicated at time t5 in the timing chart of FIG. 25. Thereafter, the four vertices of the local region 2460 are read in parallel at time t6, and the four vertices of the local region 2470 are read in parallel at time t7.

As described above, four of five memories are used by reading data from memories after switching the processing mode, resulting in efficient memory access. This improvement in efficiency can be understood by comparison with FIG. 21C for which a similar case was described. With the switching of the processing mode, the number of used memories is always four even if the number of False confirmations for processing windows increases, and therefore, memory access efficiency will not change.

In the present embodiment, all local regions shown in FIG. 24C are in an exclusive relationship. This requires a restriction on the shape of local regions, which does not limit the present invention. In the first processing mode that is similar to the first embodiment, the restriction on the shape of the local regions does not have to be imposed, but the restriction on the shape of local regions is necessary in the processing mode after the switching. This can be dealt with by various methods. One method is to restrict the shape of local regions also in the first processing mode in the same manner as in the processing mode after the switching. Another method is to prepare, in the dictionary storage unit 120, two types of dictionaries, namely a dictionary that does not include the restriction and a dictionary including the restriction, use the dictionary that does not include the restriction in the first processing mode, and use the dictionary including the restriction in the processing mode after the switching. Still another method is to perform processing using the dictionary that does not include the restriction in the first processing mode, and change the shape of the local regions by calculation so that it conforms to the predetermined restriction in the processing mode after the switching. In any case, it affects pattern identification accuracy, and it is therefore necessary to check in advance whether the change of the shape is within an allowable range. The present invention is capable of minimizing degradation of memory access efficiency by switching the processing mode.

Although the present embodiment described the method of switching the processing mode based on the count value of the number of processing windows with the False confirmation, the present invention is not limited thereto. For example, the operations up to feature extraction in a predetermined local region may be performed in the processing mode described in the first embodiment, and the operations for subsequent processes may be performed in the processing mode after the switching.

Although an input to the pattern identifying unit 107 is image information and accumulated image information is created inside in the present embodiment, the input may be accumulated image information that is created in advance. In this case, the generating unit 112 may output the input as is to the distribution writing processing unit 113. Also, the generating unit 112 may have a configuration in which it is separate from the pattern identification unit 107 and is connected directly to the bus interface 111 and the distribution writing processing unit 113.

Although the present embodiment described the reading of the accumulated image information, it is only because the data used in the feature amount calculation processing is accumulated image information, and the data to be read is not limited to the accumulated image information. If the information used in the feature amount calculation processing is image information, it may be a method of storing the image information in the memories and reading it therefrom.

Although the description has been given in the present embodiment using two-dimensional information such as accumulated image information, the present invention is not limited thereto, and it is apparent that the present invention is also applicable to one-dimensional and three-dimensional information.

In the above embodiments, the cases of one-dimensional to three-dimensional information were described. Further, even in the case of multi-dimensional input information that is in dimensions larger than three dimensions, it is apparent that the present invention is applicable, if such multi-dimensional input information is considered similarly as hyper-rectangles. It can be easily understood from the above description that the pattern identifying apparatus that is generalized up to multi-dimensions, that is, N dimensions has the following configuration. That is, An apparatus in which a plurality of processing target regions are arranged at a predetermined interval $S_1, S_2, \ldots, S_N$ in each dimensional direction of input data in N dimensions, and that identifies a predetermined pattern from each processing target region, includes:

an input unit that inputs Nth-dimensional data; a plurality of storage units whose total number is $P_1 \times P_2 \times \ldots \times P_N$, $P_1, P_2, \ldots,$ and $P_N$ being assigned to each dimension to hold input data obtained from the input unit;

a writing unit that writes the input data in the plurality of storage units in accordance with a predetermined rule;

a parallel reading unit that reads, in parallel, data at the same position in each of the processing target regions relative to a reference point, which is provided in each processing target region;

a feature amount calculating unit that calculates a feature amount using a plurality of sets of data that is read by the parallel reading unit; and an identifying unit that identifies a predetermined pattern using the feature amount calculated by the feature amount calculating unit, wherein at least one of pairs of the intervals $S_1, S_2, \ldots, S_N$ in each dimension and the $P_1, P_2, \ldots, P_N$ storage units is in a coprime relationship.

Here, it is desirable that processing target regions to be read by a parallel reading unit are consecutive processing target regions, the number of which is larger than or equal to 1 and smaller than or equal to $P_n$, with respect to an $n^{th}$ dimensional direction.

Also, assuming that the number of data sets that can be read simultaneously from one of the storage units is $q_1$ ($1 \leq i \leq P_1 \times P_2 \times \ldots \times P_N$) and that the number of data sets that can be read simultaneously from all of the storage units is a sum Q of $q_i$, it is desirable that the number of the processing target regions to be read in parallel by the parallel reading unit is larger than or equal to 2 and smaller than or equal to Q (smaller than or equal to $P_1 \times P_2 \times \ldots \times P_N$), and that the positional relationship between the processing target regions is determined based on the writing rule in the writing unit.

Also, the method of assigning the two-dimensional accumulated image information while changing the phase in accordance with the position in the y direction described in the second embodiment is also applicable to other dimensions. In the above embodiments, parallel reading of input data at points in processing windows in a window group is enabled by establishing a coprime relationship between the interval between adjoining processing windows and the number of assigned memories. Also, the memories described in the above embodiments were single-port memories from which one set of data can be read at a time. However, the present invention is not limited thereto, and memories from which multiple sets of data can be read at a time may alternatively be used. For example, a case is considered where input data is interleaved using dual-port memories from which two sets of data can be read at a time. FIGS. 20A and 20B show diagrams in which a one-dimensional array 2000 is distributed to four dual-port memories 2090 to 2093. FIG. 20A is a logical image of the one-dimensional array. Consider the case where processing windows 2010 to 2018 are arranged at an interval of $S_1=3$, and data 2020 to 2027 is read. Reference points are left ends of the respective processing windows. FIG. 20B shows a diagram in which the data in the one-dimensional array is stored in a physical memory. In FIG. 20B, the locations in which the points of the data 2020 to 2027 are stored are shadowed. Since data 2020 to 2027 is located at the same position relative to the respective reference points, an interval between adjoining data is equal to $S_1$, and the data are arranged at an equal interval. This interval and the number of memories are in a coprime relationship, the points of the data 2020 to 2023 are assigned to the respective memories one by one, and points of the data 2024 to 2027 are also assigned to the respective memories one by one in a similar manner. As a result, two points are assigned to each memory. The memories assigned at this time are dual-port memories from which two sets of data can be read at a time, eight sets of data 2020 to 2027 can be read in parallel. This is applicable similarly to two dimensions, three dimensions, or larger multi-dimensions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-140034, filed Jun. 21, 2012, which is hereby incorporated by reference herein in its entirety.

What is claimed is:

1. A pattern identifying apparatus in which a plurality of processing target regions are arranged in a reticular pattern at a predetermined interval $S_1, S_2, \ldots, S_N$ in each dimensional direction of input data in N dimensions, and that identifies a predetermined pattern from each processing target region, the apparatus comprising:
   an input device that inputs data in the N dimensions;
   a processor;
   a plurality of memories whose number is a product of numbers that are assigned to respective dimensions to hold input data obtained by the input device;
   a memory access controller that writes the input data in the plurality of memories in accordance with a predetermined rule and reads, in parallel, data at the same position in each of the processing target regions relative to a reference point, which is provided in each of the processing target region;
   wherein a feature amount is calculated using a plurality of sets of data that are read in parallel by the memory access controller; and
   wherein a predetermined pattern is identified using the feature amount calculated,
   wherein at least one pair of the interval determined for each dimensional direction and a corresponding number of the memories is in a coprime relationship.

2. The apparatus according to claim 1, wherein the input data is accumulation information.

3. The apparatus according to claim 1, wherein the memory access controller changes a phase in accordance with a position in each dimensional direction when the input data is written into the plurality of memories.

4. The apparatus according to claim 1, wherein the predetermined dimensions are N dimensions, and the processing target regions are arranged so as to be shifted in a houndstooth pattern at an interval $S_1, S_2, \ldots, S_N$ in each dimensional direction.

5. The apparatus according to claim 1, wherein the number of the plurality of memories is $P_n$ with respect to an $n^{th}$ dimensional direction, and the processing target regions to be read by the memory access controller is consecutive processing target regions whose number is larger than or equal to 1 and smaller than or equal to $P_n$.

6. The apparatus according to claim 1, wherein the predetermined dimensions are N dimensions,
   the number of the plurality of memories is $P_n$ with respect to an $n^{th}$ dimensional direction, and
   assuming that the number of sets of data that can be simultaneously read from one of the plurality of memories is qi ($1 \leq i \leq P_1 \times P_2 \times \ldots \times P_N$) and the number of sets of data that can be simultaneously read from all of the plurality of memories is a sum Q of $q_i$, the number of the processing target regions that are read in parallel by the memory access controller is larger than or equal to 2 and smaller than or equal to Q, and a positional relationship between the processing target regions is determined based on the rule of writing of the memory access controller.

7. An apparatus in which a plurality of processing target regions are arranged in a reticular pattern at a predetermined interval $S_1, S_2, \ldots, S_N$ in each dimensional direction of N-dimensional input data, and that identifies a predetermined pattern from each processing target region, the apparatus comprising:
   an input device that inputs the N-dimensional data;
   a processor;
   a plurality of memories whose total number is $P_1 \times P_2 \times \ldots \times P_N$, $P_1, P_2, \ldots,$ and $P_N$ being assigned to each dimension to hold input data obtained by the input device;
   a memory access controller that writes the input data in the plurality of memories in accordance with a predetermined rule and reads, in parallel, data at the same position in each of the processing target regions relative to a reference point, which is provided in each of the processing target region;
   wherein a feature amount is calculated using a plurality of sets of data that is read by the reading unit memory access controller; and
   wherein a predetermined pattern is identified using the feature amount calculated,
   wherein the memory access controller changes a phase of an order of writing of the input data in the plurality of memories, in accordance with a position of each dimensional direction, and
   the number of the processing target regions that are targets to be read in parallel by the memory access controller is larger than or equal to 2 and smaller than or equal to $P_1 \times P_2 \times \ldots \times P_N$, and the phase is adjusted so that data can be read from the plurality of the processing target regions in parallel.

8. The apparatus according to claim 7, wherein the input data is accumulation information.

9. The apparatus according to claim 7, wherein the memory access controller has a first read processing mode and a second read processing mode for reading data in parallel, and wherein a switching is performed between the first read processing mode and the second read processing mode.

10. The apparatus according to claim 9, wherein the first read processing mode is a processing mode in which data at the same position relative to a reference point in each of the processing target regions is read in parallel, and the second read processing mode is a processing mode in which data in one processing target region is read in parallel.

11. The apparatus according to claim 9, wherein the switching is performed when processing for identifying a pattern matches a predetermined condition.

12. The apparatus according to claim 9,
   wherein the number of the plurality of processing target regions that are targets of reading by the memory access controller is counted,
   wherein the switching is performed under a condition that a value to be counted has reached a predetermined threshold value.

* * * * *